(12) United States Patent
Schumann et al.

(10) Patent No.: US 6,285,774 B1
(45) Date of Patent: Sep. 4, 2001

(54) SYSTEM AND METHODOLOGY FOR TRACING TO A SOURCE OF UNAUTHORIZED COPYING OF PRERECORDED PROPRIETARY MATERIAL, SUCH AS MOVIES

(75) Inventors: Robert W. Schumann, Oakton; Siu-Leong Iu, Falls Church; Kobad Bugwadia, Sterling; Guillaume Mercier, Sterling; Shiva Ramadoss, Sterling; Michael Bergeron, Glen Allen; Jack Ehrhardt, Richmond, all of VA (US)

(73) Assignee: Digital Video Express, L.P., Herndon, VA (US)

( * ) Notice: Subject to any disclaimer, the term of this patent is extended or adjusted under 35 U.S.C. 154(b) by 0 days.

(21) Appl. No.: 09/092,898

(22) Filed: Jun. 8, 1998

(51) Int. Cl.⁷ .................................. H04K 1/00; H04N 7/16

(52) U.S. Cl. ............................................. 382/100; 380/202

(58) Field of Search ...................................... 382/232, 233, 382/235, 239, 244, 100; 348/413, 416, 699, 460, 473; 380/201, 202, 210, 216, 217, 287, 54

(56) References Cited

U.S. PATENT DOCUMENTS

| | | | |
|---|---|---|---|
| 4,528,588 | 7/1985 | Löfberg | 358/122 |
| 4,571,642 | 2/1986 | Hofstein | 360/37.1 |
| 4,595,950 | 6/1986 | Löfberg | 358/122 |
| 4,663,674 | 5/1987 | Osawa | 360/14.1 |
| 4,916,736 | 4/1990 | Ryan | 380/11 |
| 4,924,328 | 5/1990 | Endoh et al. | 360/60 |
| 4,956,806 | 9/1990 | Crowe et al. | 364/900 |

(List continued on next page.)

FOREIGN PATENT DOCUMENTS

| | | | |
|---|---|---|---|
| 0 107 567 A1 | 5/1984 | (EP) | G11B/23/28 |
| WO96/06503 A1 | 2/1996 | (WO) | H04N/7/08 |
| WO97/13248 A1 | 4/1997 | (WO) | G11B/20/00 |
| WO98/03014 A1 | 1/1998 | (WO) | H04N/7/08 |

OTHER PUBLICATIONS

Pfitzmann, "Trials of Traced Traitors," *Proc. 1st Int. Workshop on Information Hiding*, May/Jun. 1996, pp. 49–64.*

Hartung et al., "Digital Watermarking of Raw and Compressed Video," *Proc. SPIE vol. 2952: Digital Compression Technologies and Systems for Video Communications*, Sep. 1996, pp. 205–213.*

Hartung et al., "Watermarking of MPEG–2 Encoded Video Without Decoding and Re–encoding," *Proc. SPIE vol. 3020: Multimedia Computing and Networking 97*, Feb. 1997, pp. 264–274.*

(List continued on next page.)

*Primary Examiner*—Andrew W. Johns
(74) *Attorney, Agent, or Firm*—McDermott, Will & Emery

(57) ABSTRACT

To enable the source of an unauthorized copy of an information-bearing medium, such as a video DVD, to be traced, a compressed digital signal stream to be stored on the medium is altered to include "running marks," that comprise pixel blocks changing in position frame by frame and encoded with information designating where and when the copy was made. The medium under test is played back synchronously with a reference medium containing the locations of the running marks together with original video. The source of copying message is advantageously encrypted and scrambled to avoid detection or alteration by a copyist. The message preferably is spread, for example into a spread spectrum carrier, to enhance discrimination among a large number of sources and enable demodulation in the presence of noise.

39 Claims, 32 Drawing Sheets

U.S. PATENT DOCUMENTS

| | | | |
|---|---|---|---|
| 5,134,496 | | 7/1992 | Schwab et al. ................... 358/335 |
| 5,179,452 | | 1/1993 | Takahashi ........................ 358/335 |
| 5,243,411 | | 9/1993 | Shirochi et al. .................... 358/12 |
| 5,251,041 | | 10/1993 | Young et al. ..................... 358/310 |
| 5,294,974 | * | 3/1994 | Naimpally et al. ................ 348/395 |
| 5,359,725 | | 10/1994 | Garcia et al. ...................... 395/500 |
| 5,416,915 | | 5/1995 | Mattson et al. ................... 395/425 |
| 5,471,252 | * | 11/1995 | Iu ........................................ 348/699 |
| 5,504,892 | | 4/1996 | Atsatt et al. ....................... 395/600 |
| 5,530,751 | | 6/1996 | Morris ..................................... 380/4 |
| 5,537,216 | | 7/1996 | Yamashita et al. ................ 358/335 |
| 5,537,588 | | 7/1996 | Engelmann et al. .............. 395/600 |
| 5,548,759 | | 8/1996 | Lipe .................................... 395/600 |
| 5,561,815 | | 10/1996 | Takata et al. ...................... 395/833 |
| 5,574,787 | | 11/1996 | Ryan ....................................... 380/5 |
| 5,579,390 | | 11/1996 | Ryan et al. .......................... 380/11 |
| 5,586,327 | | 12/1996 | Bealkowski et al. ............. 395/652 |
| 5,636,292 | | 6/1997 | Rhoads ................................ 382/232 |
| 5,651,065 | | 7/1997 | Stufflet et al. ....................... 380/15 |
| 5,659,791 | | 8/1997 | Nakajima et al. ................. 395/802 |
| 5,739,864 | * | 4/1998 | Copeland ........................... 348/473 |
| 5,809,139 | * | 9/1998 | Girod et al. ........................... 380/5 |
| 5,850,481 | * | 12/1998 | Rhoads .............................. 382/232 |
| 5,960,081 | * | 9/1999 | Vynne et al. ....................... 380/10 |

OTHER PUBLICATIONS

Hartung et al., "Digital Watermarking of MPEG–2 Coded Video in the Bitstream Domain," *IEEE Proc. Conf. on Acoustics, Speech and Signal Processing,* Apr. 1997, pp. 2621–2624.*

Hartung et al., "Fast Public–key Watermarking of Compressed Video," *IEEE Proc. Int. Conf. on Image Processing,* Oct. 1997, pp. 528–531.*

Hsu et al., "DCT–Based Watermarking for Video," *IEEE Trans. on Consumer Electronics,* vol. 44, No. 1, Feb. 1998, pp. 206–216.*

Hartung et al., "Watermarking of Uncompressed and Compressed Video," *Signal Processing,* vol. 66, May 1998, pp. 283–301.*

Whipple, David P., "The CDMA Standard", *Applied Microwave & Wireless,* pp. 24–37 (No date).

* cited by examiner

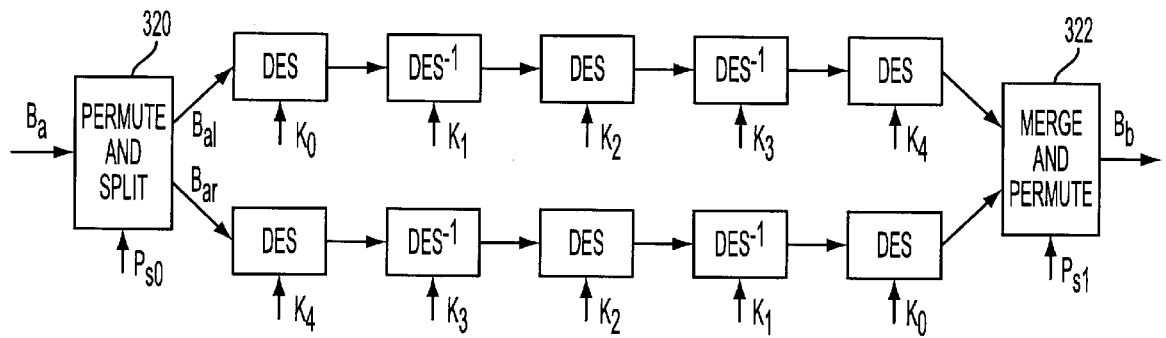
FIG. 5
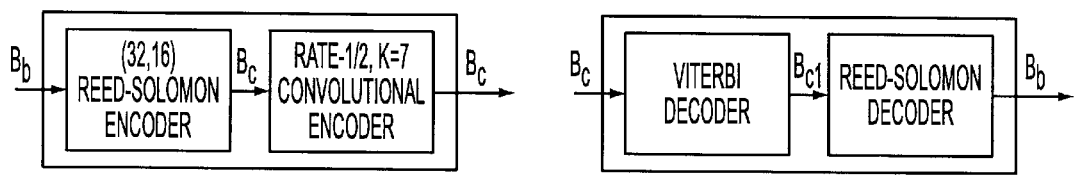
FIG. 6A                    FIG. 6B
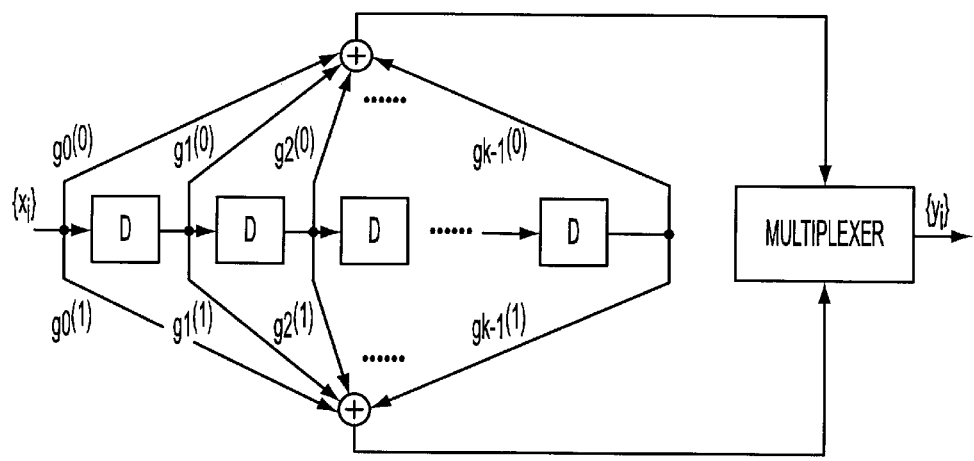
FIG. 7

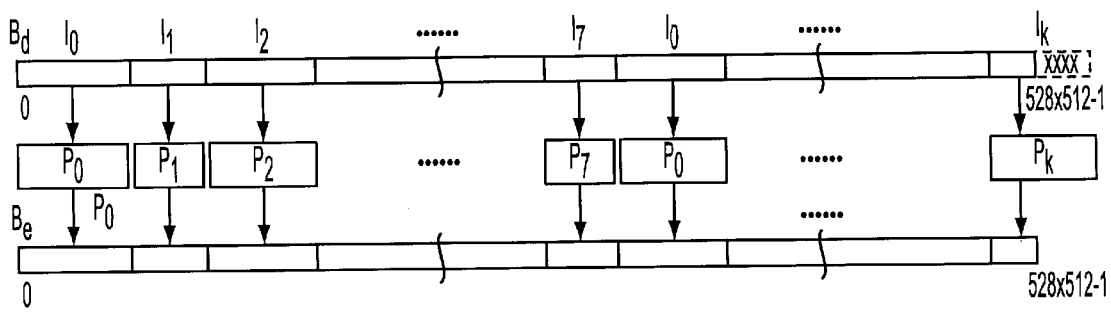
FIG. 9A
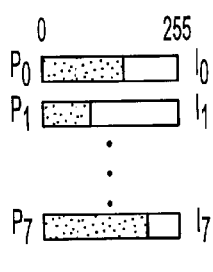
FIG. 9B
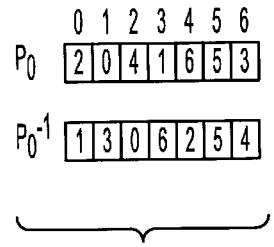
FIG. 9C
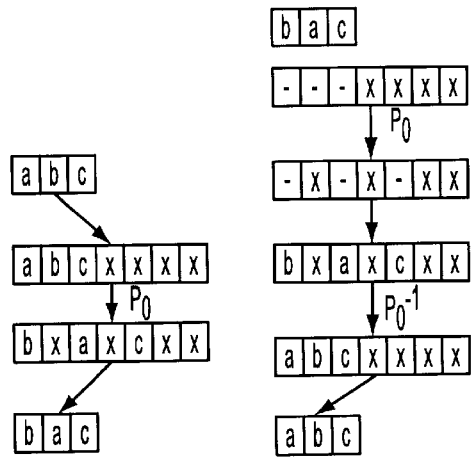
FIG. 9D
FIG. 9E

```
1   for all the blocks of a MH
2       Assign all the DCT coefficients to the Mhblock[0] [block];
3
4   Initialize the random number generator with an input seed number;
5
6   for all the blocks of a MH {
7       Select nDCT and sigma for luminance and chrominance blocks;
8       Generate Arr[ ] of nDCT elements randomly with values of 0, 1 and 2
9           according to the input ratio;
10
11      for(i = 0; i < 64; i+ +) {
12          if( 1 < = i < =nDCT) {
13              if ( Arr [i] ==1 ) {
14                  MHblock[1] [block] [i] = MHBlock [0] [block] [i]  + sigma;
15                  MHblock[2] [block] [i] = MHBlock [0] [block] [i]  - sigma;
16              }
17              else if ( Arr[i] = = 2 )   {
18                  MHBlock [1] [block][i] = MHBlock [0][block] [i] - sigma;
19                  MHBlock [2] [block][i] = MHBlock [0][block] [i] + sigma
20              }
21              else {
22                  MHBlock [1] [block] [i] = MHBlock [0][block] [i];
23                  MHBlock [2] [block] [i] = MHBlock [0][block] [i];
24              }
25          }
26          else {
27              MHBlock[1] [block] [i] = MHBlock[0][block][i];
28              MHBlock[2] [block] [i] = MHBlock[0][block][i];
29          }
30      }
31      Bound MHblock [1] [block] and Mhblock [2] [block] into legal DCT range;
```

FIG. 12

| 0 | 4 | 1 | -1 | -7 | -6 | 2 | 1 | 9 | 0 | -1 | 5 | 7 | -4 | 3 | 0 |
|---|---|---|---|---|---|---|---|---|---|---|---|---|---|---|---|
| 0 | -3 | -2 | 5 | 0 | 0 | 4 | -4 | 9 | 0 | -1 | -2 | 0 | -1 | 2 | 1 |
| 1 | -2 | -4 | 1 | 3 | 0 | 3 | 2 | 1 | -5 | 1 | -2 | -3 | -3 | -3 | 0 |
| 2 | 3 | 1 | -2 | -1 | -3 | 2 | 9 | 1 | -5 | 1 | 1 | 1 | -3 | -4 | 3 |
| 1 | 1 | 7 | 1 | -2 | -4 | 2 | 2 | 9 | 1 | -4 | -1 | 3 | 5 | 2 | 4 |
| 1 | 1 | 5 | -3 | 1 | 0 | -1 | -2 | 2 | 1 | -4 | -4 | -1 | 5 | 0 | -1 |
| 4 | 1 | 0 | -9 | 5 | 2 | -2 | 0 | -6 | -4 | -2 | -5 | -4 | 3 | -5 | -1 |
| 4 | -6 | -3 | -8 | 3 | 1 | -1 | 0 | 1 | -4 | -2 | -4 | -4 | 6 | -5 | 6 |
| -2 | 3 | 6 | -5 | -3 | 0 | 3 | -2 | 2 | -2 | -5 | 3 | 2 | 2 | -3 | -4 |
| 6 | -1 | 0 | -7 | 1 | -7 | 0 | -2 | 2 | 0 | -3 | 4 | 8 | 3 | -2 | 0 |
| 1 | -4 | -4 | 0 | 8 | -5 | 1 | 0 | -3 | 3 | 4 | 2 | 1 | -2 | 5 | 4 |
| -6 | 0 | 0 | 7 | 9 | -1 | 5 | 2 | -7 | 0 | 4 | 0 | -5 | -8 | 4 | 0 |
| -2 | 5 | 1 | 6 | 3 | 0 | 4 | 0 | -4 | -2 | -3 | -1 | 3 | -7 | -5 | -3 |
| -2 | -2 | -1 | 1 | 5 | -2 | 2 | -4 | 2 | 0 | 0 | -1 | -2 | -4 | -3 | 1 |
| -5 | -4 | -2 | 1 | 4 | 0 | -1 | -5 | 1 | 2 | 7 | -1 | -9 | 0 | 3 | 5 |
| 0 | 3 | 2 | 1 | -4 | 0 | -3 | -3 | -3 | 1 | 6 | 1 | -3 | 6 | -2 | 4 |

FIG. 13

```
0   /* For:  An algorithm of run-time module for a running mark system. */
1   /* By:   Siu-Leong Iu & Guillaume Mercier of Circuit City Stores Inc., 4/28/98*/
2
3   int RunTimeModule( ) {
4     int i;
5     int errorNum = NoError;
6     u8 StreamId, SubStreamId, DivxStreamId;
7
8     while (readSector( )  != EndofDVD) {
9        errorNum = RunningMarking( ) ;
10       ErrorAction(errorNum);
11       readFromSector  StreamId;
12       switch(StreamId) {
13       case VideoStream:
14          Decode MPEG video bitstream and send result to video port;
15          break;
16       case AudioStream;
17          Decode MPEG audio bitstream and send result to audio port;
18          break;
19       case PrivateStream1:
20          readFromSector  SubStreamId;
21          switch(SubStreamId) {
22          case ProviderStream:
23             readFromSector  DivxStreamId;
24             switch(DivxStreamId) {
25             case RMGStream:
26                readFromSector bc,  NumRMG, NumBS, FNextRMG, FSizeHole, ReplaceMode;
27                if( ! FSizeHole)
28                  readFromSector   Reserved B,  SizeHole;
29                for( i =0; i<NumRMG; i ++)
30                   ReadFromSector  RMG_Data [i];
31                break ;
32             case OtherDivxStreams:
33                break;
34             }
35             break ;
36          case OtherSubStreams:
37             break ;
38          }
```

FIG. 16A

```
39          break ;
40        case PrivateStream2:
41          Process private stream 2;
42          break;
43        }
44      }
45      return(errorNum) ;
46  }
47
48  int RunningMarking( ) {
49    int i, j ;
50    int errorNum = NoError;
51
52    for ( i =0; i <NumRMG ; i ++ ) {
53        if(FNextRMG) NextRMG = RMG_Data [i]. NextRMG;
54        else          calculate NextRMG;
55        if (FSizeHole)
56          SizeHole = RMG_Data [i]. SizeHole;
57        SectorNum = RMG_Data [i]. SectorNum;
58        if (SectorNum > CurrentSectorNum)
59          break ;
60        bcIncrMode = RMG_Data [i]. bcIncrMode;
61
62        if (SectorNum == CurrentSectorNum) {
63          Offset = RMG_Data [i] . Offset;
64          for(j=0; j<NumBS; j++)
65            b[j]=RMG_Data[i].b[j];
66          ReplaceMessageHoleData(ReplaceMode. bc);
67        }
68        update bc by bcInrValue using bcInrMode;
69    }
70
71    return (errorNum);
72  }
73
```

FIG. 16B

```
74  void ReplaceMessageHoleData (u6 Mode, u32 bc) {
75    u16 sendBit=0;
76    locate MH bits of Message Hole using SectorNum and Offset;
77    switch(Mode) {
78    case 0: /* Replace MH bits with b[0]*/
79      replace MH bits with b[0];
80      break;
81    case 1:/* Replace MH bits with b[sendbit-1]*/
82      extract n_0 bits from Bits[ ] pointed by bc and store them to sendbit as in
83        figure 4;
84      if (0<sendbit && sendbit<=NumBS)
85        replace MH bits with b[sendbit-1];
86      break;
87    case 2:/* Replace MH bits with b [reverse(sendbit)-1] */
88      extract n_0 bits from Bits[ ] pointed by bc and store them to sendbit as in
89        figure 4;
90      reverse each one of n_0 least significant bits of sendbit;
91      if (0<sendbit && sendbit<=NumBS)
92        replace MH bits with b[sendbit-1];
93      break;
94    case OtherVersions:
95      break;
96    }
97  }
```

FIG. 16C

```
1    Obtain values for the Width, Height, nFrames, numMHrow, and seed parameters;
2
3    MB_Width = Width / 16;
4    Make sure the numMHrow parameter is in a range of 0 to MB_Width;
5    Initialize the random number generator with the value of the seed parameter;
6
7    for (each frame in a total of nFrames frames) {
8       Clear (empty) the list of candidate MH addresses, MHAlist;
9       for (each MB row of the current frame) {
10          lowMBA = the MBA of the first MB in that row;
11          highMBA = the MBA of the last MB in that row;
12          while (less than numMHrow MHs have been selected on this MB row) {
13             do {
14                randMBA = a psuedo-random integer between lowMBA
                             and highMBA;
15             } while (randMBA is found in MBAlist);
16             Append randMBA to MHAlist;
17          }
18       } /* next MB row */
19       Sort the MHA in MHAlist into ascending order;
20       Output the entire MHAlist;
21    } /* next frame */
```

FIG. 19

```
1     initialize( );
2
3     while (      the no. of MHs requested have not been obtained and
4                       the number of MBs examined is less than the maximum limit)
5     {
6         thisMBA = a randomly selected MBA of a MB that is available;
7         thisMB = the MB located at thisMBA;
8         MBrow = the MB row in which thisMB lies;
9         MBcol = the MB column in which thisMB lies;
10
11        if (most pixel values of thisMB are not within an acceptable range)  {
12                Mark thisMB as unavailable;
13        } else   {
14                class_type = Classify_MacroBlock(thisMB);
15                if (class_type is TEXTURED)  {
16                    if (MBrow doesn't already have the maximum no. of MHs per row on it)
      {
17                        Mark thisMB as picked;
18                        Mark the MHspace MBs on both sides of thisMB as
                              unavailble;
19                    }
20                } else if (class_type is SMOOTH)  {
21                    Mark thisMB as unavailable;
22                }
23        }
24    }
```

FIG. 20 initialize( )

```
1   for (all MBs in the image)   {
2      Mark them as available;
3   }
4
5   for (all MHs selected in the previous frame)   {
6      Mark them as unavailable;
7   }
8
9   for (j = all the rows in the image)   {
10     if (this row is the first or last row)                     {
11            for (all the MBs in the row)   {
12                   Mark them as unavailable;
13            }
14     } else {
15            for (all MBs within BorderLimit distance from the border)
       {
16                   Mark them as unavailable;
17            }
18     }
19  }
```

FIG. 21

Classify MacroBlock( ):

Notations used:
    $E_v$ – Vertical Energy
    $E_h$ – horizontal energy
    $E_d$ – diagonal energy
    $E_a$ – Average energy

```
1     for (each of the 4 luminance 8x8 blocks in the MB)   {
2         dct = the matrix of DCT coefficients of the block;
3         Eh      = (dct[0][2]² + dct[0][3]² + dct[0][4]²
4                 + dct[1][2]² + dct[1][3]² + dct[1][4]² )/6;
5         Ev      = (dct [2][0]² + dct[3][0]² + dct[4][0]²
6                 + dct[2][1]² + dct[3][1]² + dct[4][1]² )/6;
7         Ed      = (dct[0][1]² + dct[1][0]² + dct[1][1]²
8                 + dct[2][2]² + dct[2][3]² + dct[3][2]² + dct[3][3]² )/7;
9         Ea = (Eh + Ev + Ed)/3;
10        if (Ea > T1)
11            Classify the 8x8 block as TEXTURED;
12    } /* next block */
13
14    if (3 or 4 blocks in the MB are classified to be TEXTURED)
15        The MB type is TEXTURED;
16    else
17        The MB is SMOOTH;
```

FIG. 22 rdbMHfn( ):

Notations used:

TotalMHsize – sum of the size of the MHs that have been selected;
MaxMHsize – the maximum total size of all MHs allowed in a section;
MHsize – the size of the selected MH;

```
1    initialize( );
2
3    while (     there are MHs in the section that have not been selected
4                        and TotalMHsize < MaxMHsize)
5    {
6         for (thisFrame = all B frames in the section)   {
7                 Process the first frame every 1/startIncr times through this loop;
8                 Process the last frame every 1/endIncr times through this loop;
9                 if (there are MHs in thisFrame that have not been selected)    {
10                        selectedMH = the smallest MH of the unselected ones in thisFrame;
11                        MHsize = the size of selectedMH;
12                        if (TotalMHsize + MHsize <= MaxMHsize)    {
13                                Add MHsize to TotalMHsize;
14                                Select selectedMH as a final MH;
15                        } else {
16                                Break out of (terminate) the while loop;
17                        }
18                }
19        }
20   }
21
22   for (all MHs selected during the last iteration of the preceding while loop)   {
23        deselect the MH;
24   }
25
26   step = round(no. of B frames per section / no. of MHs deselected);
27
28   for (thisFrame = every 'step' B frames in the section)    {
29        if (there are MHs in thisFrame that have not been selected)    {
30                selectedMH = the smallest MH of the unselected ones in thisFrame;
31                MHsize = the size of selectedMH;
```

FIG. 24A

```
32          if (TotalMHsize + MHsize <= MazMHsize)   {
33                  Add MHsize to TotalMHsize;
34                  Select selectedMH as a final MH;
35          }
36      } else  {
37          while (all B frames in the section have not been searched)   {
38              Search on both sides of thisFrame;
39              if (a frame is found with and unselected MH)   {
40                  selectedMH = the smallest MH of the   unselected ones in thisFrame;
41                  MHsize = the size of selectedMH;
42                  if (TotalMHsize + MHsize <= MaxMHsize)   {
43                      Add MHsize to TotalMHsize;
44                      Select selectedMH as a final MH;
45                  } else {
46                      Break out of (terminate) the while loop;
47                  }
48              }
49          }
50      }
51  }
52
53  Output all the MHs picked by this algorithm.
```

FIG. 24B

Initialize( )

Notations used:

```
1    if ( the last B frame of the previous section is
         the first B frame of the current section)
2    {
3        Add 1 to the no. of B frames to be processed;
4    }
5
6    for (all B frames in the section)  {
7        for (all MHs in the B frame)  {
8            if (the MH is on a DVD boundary)  {
9                Mark this MH as unavailable;
10           }
11       }
12   }
```

FIG. 25

```
1   for (each row in the current frame) {
2     if (this row is a MH row) {
3       iterStatus = Inc_Mquant_Row;
4       for (iterCnt = 0; iterCnt < = IterMax; iterCnt ++) {
5         if ( ( iterCnt ! = 0 ) and (iterStatus ! = Final_Iteration ) ) {
6           Increase the mquant value of selected MB by 1;
7         }
8         Re-encode the whole row using the current mquant values for each MB;
9         if ( iterStatus == Final_Iteration )
10          Store the encoded bit stream for the whole row into the Row Buffer;
11        else
12          Only count the number of bits needed to re-encode row;
13        Byte Align the number of bits needed to re-encode row;
14        if (iterStatus == Final_Iteration) {
15          Write video and mpeg information for MHs in the row to output Fifo;
16          Exit the iteration loop;
17        }
18        else if ( BitsDiff < = 0 )
19          iterStatus = Final_Iteration;
20        else
21          Select the next MB;
22      }
23      Perform bit stuffing to make OrigNumBits = RowBitCnt;
24      Replace original row with the ecoded bits from Row Buffer;
25    }
26  }
```

FIG. 27

```
1   for (each row in the current frame) {
2     if (this row is MH row) {
3       iterStatus=Inc_Mquant_Row;
4       for (iterCnt=0; iterCnt<=IterMax; iterCnt++) {
5         if (iterCnt !=0) {
6           if (iterStatus== Inc_Mquant_Row
7             Increase the mquant value of all MBs in the row by delta;
8           else if (iterStatus== Inc_Mquant_MB)
9             Increase the mquant value of selected MB by 1;
10        }
11        Re-encode the whole row using the current mquant values for each MB:
12        if (iterStatus==Final_Iteration)
13          Store the encoded bit stream for the whole row into the Row Buffer;
14        else
15          Only count the number of bits needed to re-encode row;
16        Byte Align the number of bits needed to re-encode row;
17        if (iterStatus==Final_Iteration) {
18          Write video and mpeg information for MHs in row output Fifo;
19          Exit the iteration loop;
20        }
21        else if (BitsDiff<0) {
22          if (iterCnt==0)
23            iterStatus=Final_iteration;
24          else if (iterStatus==Inc_Mquant_Row) {
25            Decrease the mquant values of all MBs by delta;
26            iterStatus=Inc_Mquant_MB;
27            Select the first MB in the row;
28          }
29          else if (iterStatus==Inc_Mquant_MB)
30            iterStatus= Final_Iteration;
31        }
32        else if (BitsDiff==0)
33            iterStatus= Final_Iteration;
34        else if (iterStatus=Inc_Mquant_MB)
35            Select the next MB;
36      }
37      Permit bit stuffing to make OrigNumBits=RowBitCnt;
38      Replace original row with encoded bits from Row Buffer;
39    }
40  }
```

FIG. 28

```
1   Sum=PrevBitCnt ;
2
3   For ( i=0; i < MB_width; i ++ ) {
4       Sum=Sum+( Bi(k)-Bi(k-1) );
5       if (Sum<=RowBitCnt) {
6           j=i;
7           break;
8       }
9   }
```

FIG. 29

```
1   Read the 4 character re-encoding mode from the input parameter file;
2   for ( each frame from the image input file )
3   {
4       Decode the frame;
5       Get the encoding and display frame numbers;
6       if ( FirstTime )
7           allocate memory for MH information;
8       if ( end of sequence reached )
9       {
10          re-distribute the MHs in the remaining processed frames;
11          break;
12      }
13      if ( it is a B frame )
14      {
15          if ( MHProcMode[0] == GEN_MH_FROM_CLASSIFICATION )
16              generate MHs for frame with classification;
17          Re-encoding( );
18      }
19      if ( all frames in a Session have been processed )
20          re-distribute the MHs within all the processed frames in a
21          session;
22  }
```

FIG. 32

```
1   for (each row of MBs in the current frame){
2     if (this row is a MH row) {
3       iterStatus=Inc_Mquant_Row;
4       for (iterCnt=0; iterCnt<=IterMax; iterCnt ++) {
5         if (iterCnt !=0){
6           if (iterStatus==Inc_Mquant_Row)
7             Increase the mquant values of all MBs in the row by delta;
8           else if (iterStatus==Inc_mquant_MB)
9             Increase the mquant value of selected MB by 1;
10        }
11        Re-encode the whole row using the current mquant values for each MB;
12        if (iterStatus == Final_Iteration)
13          Store the encoded bit stream for the whole row into the Row Buffer;
14        else
15          Only count the number of bits needed to re-encode row;
16        Byte Align the number of bits needed to re-encode row;
17        if (iterStatus==Final_Iteration) {
18          Write video and mpeg information for MHs in the row to output Fifo;
19          Exit the iteration loop;
20        }
21        else if (BitsDiff<0) {
22          if (iterCnt==0)
23            iterStatus=final_Iteration;
24          else if (iterStatus==Inc_Mquant_Row) {
25            iterStatus=Inc_Mquant_MB;
26            Find the value of j as in figure 4.1;
27            Decrease the mquant values of MBs by delta from j-th MB;
28            Select j-th MB be the next MB to be updated;
29          }
30          else if (iterStatus==Inc_Mquant_MB)
31            iterStatus==Final_Iteration;
32        }
33        else if (BitsDiff==0)
34          iterStatus=Final_Iteration;
35        else if (iterStatus=Inc_Mquant_MB)
36          select next MB;
37        Save the value of the Row Buffer size to PrevBitCnt;
38      }
39      Perform bit stuffing to make OrigNumBits=RowBitCnt;
40      Replace original row with encoded bits from Row Buffer;
41    }
42  }
```

FIG. 30

SYSTEM AND METHODOLOGY FOR TRACING TO A SOURCE OF UNAUTHORIZED COPYING OF PRERECORDED PROPRIETARY MATERIAL, SUCH AS MOVIES

TECHNICAL FIELD

This invention relates generally to copy protection for data obtained from any source, such as information-bearing media, (e.g., DVD's), and more particularly to data modification to help enable an unauthorized copyist to be identified.

BACKGROUND ART

Consumer devices for recording and playback of recorded program material, such as movies, software and the like, are widely available. Media bearing such material include magnetic tape, recorded and played back using a VCR, and now more recently optical media such as CDs, CD-ROM's and DVD's. The DVD is new optical disk technology, capable of holding enough information typically for a 133 minute movie on each layer. The DVD often uses a so-called MPEG-2 data compression standard that enables video material to be efficiently stored and reproduced without significant visible degradation. Other standards for video and other types of information, such as embodied in software, can be utilized.

The cost of producing program material, such as entertainment movies, is considerable, whereas, the cost to the copyist is relatively low. Hence, movie piracy has become a substantial source of loss of revenue for the movie industry. Indeed, more than 2 billion dollars are lost to copyists annually, mainly in the form of bootleg video cassettes. DVD may make the situation even worse, as the audio and video programming from a DVD player have high fidelity and considerably more information content than that possible from VHS.

Two approaches to thwarting piracy have been implemented by legitimate producers of movies and other types of material having commercial value, such as software: (1) injecting, into a protected medium, a signal that distorts the material in some manner when played, and (2) watermarking, by injecting a visible or invisible static symbol or mark that identifies the source of the original material.

Watermarking commonly is performed on a medium at the point of authoring of protected material. An example is at a post house or other facility at which the information-bearing medium is produced. However, once recorded, the watermark is fixed. Although the watermark will identify the source of authoring of the material, it will provide no information on the identity of an unauthorized copyist. The identity of the copyist must be obtained from information gathered at the point of playback and copying. This may include such information as identification of the equipment used by the copyist and time of copying. Circuitry to provide this information at the playback unit, however, will increase the cost of the unit, a considerable disadvantage in this competitive industry. An objective of this invention is to produce a tracing signal at the point of use, that varies in dependence of, and is unique to, the copyist of a protected medium. Another objective is to do so without adding significant cost to the playback unit. An objective further is to carry this function out in digital or analog space, depending on the domain of the medium.

The protective signal furthermore must be unpredictable, as predictability will enable a copyist either to filter out the signal, or alter it so as to provide a false designation of source. The protective system further must be robust, as any source of copying message injected into the signal stream must be recovered in an environment having heavy transmission noise, and unintentional or intentional distortion. Furthermore, the sending message must be difficult to detect, modify or remove. The message content should be protected and difficult to decode, even if the transmitted bits identifying source are available. Finally, the output stream must be legal to enable proper decoding in the appropriate domain. An additional objective of this invention is to produce a point of use signal, injected into the signal stream of the protected medium, that is difficult for a copyist to detect or alter. The point of use signal furthermore should be able to be injected into any type of protected content, including audio and software, in addition to video.

DISCLOSURE OF INVENTION

In accordance with the invention, a method of processing an information-bearing compressed digital signal stream is performed to modify the stream by adding a "source-of-copying message" in the form of "running marks" distributed among pixel blocks or macroblocks of video frames, to enable tracing to the source of an unauthorized copy. The modified signal stream, in normal use, is sent to a television display or a monitor for viewing by a user. The running marks are subtle and generally invisible. However, if the signal stream is used to make an unauthorized recording, the recording will bear the original compressed digital stream together with a source-of-copying message. Hence, by comparing the original digital signal stream with the modified signal stream, the message can be extracted, to trace to the copyist.

In the preferred embodiment, by way of example, the compressed digital signal stream is an audio/video data stream encoded in an MPEG standard. Pixel blocks or macroblocks are selected on a frame basis as candidate regions, termed "message holes," for carrying the source of copying message. The message holes correspond to a selected segment of the MPEG bitstream relating to a block or macroblock of a picture frame which can be changed for bit modulation.

The source-of-copying message is applied to the signal stream as replacement bits during playback of the prerecorded material (such as a movie). Bit modulation of the macroblocks selected to be message holes may be performed in various ways. In the preferred embodiment, by way of example, modulation is carried out by adding or subtracting a prescribed amount of noise to or from the selected macroblock, preferably in the (DCT) discrete cosine transform domain (but alternatively in the video domain). This has the advantage of spreading out distortion within the macroblock and making pixel distortion difficult to see.

The message holes may be located in frames randomly, but preferably are selected to reside at textured portions of the image, such as at an image boundary, that will accommodate an alteration invisibly or nearly so to the user. Candidate message hole locations may be selected, for example, frame by frame (but alternatively by multiple frames at one time), by operator input or machine implementation. The selected locations then may be redistributed to form a more uniform distribution of message holes among frames. Redistribution may be based on maintaining the number of message holes to be close to a target number of message holes per frame, while avoiding clustering within any single frame or among a small number of neighboring frames.

To maintain the number of bits contained in selected macroblocks within a row relatively constant, after running marks are added, the number of bits may be compensated by MPEG re-encoding to conform to the MPEG standard and avoid buffer underflow or overflow. This may be done, for example, by varying the quantization scaling factor of macroblock pixels until the original number of macroblock bits and the bit count after encoding with running marks are approximately equal.

Following selection of message hole candidates, and during the re-encoding process, the candidate message holes are tested to determine whether they satisfy prescribed criteria and should be used for inserting source of copying message bits, and either are accepted, discarded or redistributed Examples of unsuitable or potentially unsuitable message holes include: message holes in a row that lie on a DVD sector boundary, message holes in a row that cannot be re-encoded for bit compensation, message holes that contain message bits that cannot be reliably decoded and message holes that are to be skipped following re-encoding.

The source-of-copying message may correspond to one or more of the following: serial number of the authorized playback unit from which the unauthorized copy is made, serial number of the medium copied, and time of copying. This information will help enable the unauthorized copyist to be identified by using records maintained by the institution providing the playback unit and recorded medium.

To help prevent an unauthorized copyist from decoding the source-of-copying message for the purpose of filtering out or altering that information, the message preferably is encrypted and scrambled. The message advantageously is coded using code division multiple access coding (CDMA) which enables correlation detection of source-of-copying message bits, produced by multiple playback units to make tracing to the copyist difficult.

For extracting and decoding the running mark contents of the message holes, the location of each message block is stored in a memory. A reference medium is produced bearing the original program material together with message hole locations. To identify the source of copying, the reference medium is played back in synchronism with a medium under test. Pixel blocks read from the medium under test at corresponding locations also read from the reference medium are compared with each other to determine whether the original image has been altered by source-of -copying message bits. For example, an image alteration at a message hole may designate a "1", a lack of alteration a "0," although this may be reversed. Other information formats, including other than binary format, alternatively may be implemented.

Particular objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentality's and combinations particularly pointed out in the appended claims.

BRIEF DESCRIPTION OF THE FIGURES

Reference is made to the drawings, wherein elements having the same reference numeral designations represent like elements throughout, and wherein:

FIG. 5 is a diagram showing encryption of message bits using a data encryption standard.

FIGS. 6(a) and 6(b) are diagrams of concatenated error correction encoding and decoding.

FIG. 7 shows a convolutional error correcting coder implemented in an embodiment of the invention.

FIGS. 9(a)–(e) describe multiple variable length permutation to enhance security of a source-of-copying message embedded in the video stream

FIG. 12 is pseudocode showing a DCT approach for generating RM carriers, in the invention.

FIG. 13 shows a noise pattern in the pixel domain for luminance blocks using the DCT approach.

FIGS. 16A–C are algorithms describing the operation of producing running marks in the invention.

FIG. 19 is an algorithm defining gMHrow.

FIG. 20 is pseudo-code for classification of macroblocks in accord with an aspect of the invention.

FIG. 21 is pseudo-code for initialize( ) called by the classification function.

FIG. 22 is pseudo-code for another embodiment of macroblock classification.

FIGS. 24A–B are pseudo-code of a redistribution routine.

FIG. 25 is pseudo-code for initialize( ) called by the redistribution function.

FIG. 27 is an algorithm describing a first approach to MPEG re-encoding per the invention.

FIG. 28 is an algorithm describing a second approach for MPEG re-encoding.

FIG. 29 is an algorithm for locating j for the k-th iteration with k=(d+2).

FIG. 30 is an algorithm describing the third approach for MPEG re-encoding.

FIG. 32 shows an algorithm describing the GenRm program.

BRIEF DESCRIPTION OF THE TABLES

Table 1 sows Hadamard-Walsh waveforms for n=8.

Table 2 shows Hadamard-Walsh waveforms after column and row permutations.

Table 3 shows DivxStreamId for ProviderDefinedStream for different prescribed applications.

Table 4 describes the data structure of a RMG header.

Table 5 shows the data structure of RMG data.

Table 6 is a look up table for obtaining bcIncrValue from bcIncrMode.

Table 7 shows iteration status of re-encoding.

Table 8 shows different message hole processing modes.

DETAILED DESCRIPTION OF THE INVENTION

1. Overview

This invention provides for the addition of virtually invisible marks into a compressed digital data stream, the marks forming a "source-of-copying message," to enable the source of an unauthorized copy of an information-bearing medium, such as a DVD, to be traced. The best mode of the invention is described within the context of a video stream produced in an MPEG domain, although it is to be understood that the invention is not limited thereto. For example, the source-of-copying message can be combined into an audio signal or into software using similar principles. These marks are not visible to a viewer, but can be detected and decoded by hardware maintained by an authorized institution. As will be described in detail, the message may identify the serial numbers of a particular playback unit and a particular original storage medium, such as a DVD, and the playback time. Significantly, this message is uniquely produced at the playback unit each time the medium is played. By playing a medium (that may have been pirated from an authorized copy), and decoding the message embedded in the marks added to the video stream, an institution can begin to trace to the copyist. Because the contents of these marks change each time playback occurs, the marks are termed "running marks," or RMs, which differ from watermarks that do not change once created at the point of authoring.

Figure 1:
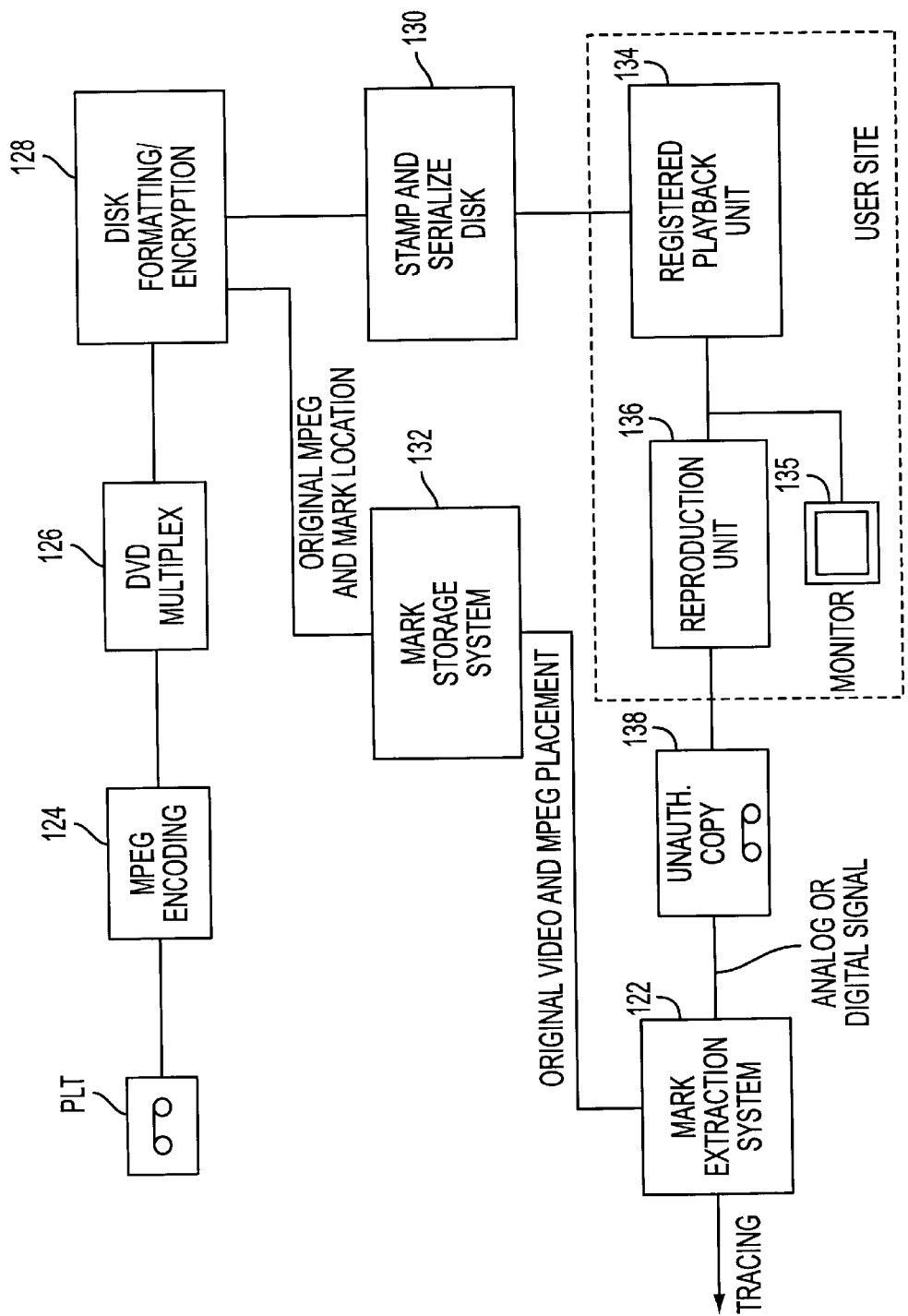
FIG. 1 is a high level functional block diagram showing creation of MPEG running mark locations, in accord with the invention.

Referring to FIG. 1, depicted in overview is the environment in which the running mark system, of the invention, may be implemented. At a recording studio, a master digital linear tape DLT carrying program material, such as a movie, is processed to convert the content of the DLT into an MPEG video stream at unit 124. The program material then is placed in a format appropriate for DVD recording by a DVD multiplexer unit 126, the encoder 124 and multiplexer 126 comprising standard equipment in this industry. The DVD multiplexer 126 adds sub-picture place holders to the MPEG video stream that reserve empty space in the bit stream for data entry.

The image represented by the video stream at the output of multiplexer unit 126 is processed by a disk formatting unit 128 to identify candidate running mark locations in the frames of the video stream, and the DVD bearing the video is stamped and serialized at a unit 130. The disk formatting unit 128 searches each video frame for candidate blocks or macroblocks to embed running marks at locations of the image where the marks will not be visible or intrusive. Data bits, representing "message holes" at these locations in the MPEG video stream (message holes are MPEG segments, in accord with the invention, each corresponding to a block or macroblock of a picture frame that can be changed for bit modulation) are given address offsets to identify locations in a frame. Replacement blocks are stored in place holders by the disk formatting unit 128.

Unit 128 sends to running mark storage unit 132 (preferably a tape or DVD), not only the original MPEG stream, but also message hole locations that will carry the video stream information for identifying playback unit, disk and time of reproduction. The storage unit 132 will be retained as a reference medium by an authorized institution to be used for extracting and decoding the running marks from a recording medium under test, to help enable the copyist to be traced.

A user is provided with a playback unit 134 that is identified by a serial number issued by the institution. The user to whom the playback unit is issued is registered with the institution. Also issued by the institution, and serialized, are the prerecorded media that may carry movies for viewing by the registered user. The registration numbers of the playback unit and prerecorded media are stored invisibly but can be read by the playback unit 134. For example, the serial number of the playback unit may be stored in a read only memory within the unit; the serial number of the medium will preferably be encoded within what is recorded on the medium. The playback unit 134 advantageously includes a real time clock that identifies the time when a medium is played. These information components are serialized and encoded into the running marks to be produced by the playback unit 134 each time a medium is played.

When a registered playback unit 134 plays the content of a prerecorded medium, in the usual case, the video stream will be reproduced by a television screen or monitor 135. An example is a customer who rents or purchases a DVD for the purpose of viewing a prerecorded movie. Running marks embedded in the video stream are not visible on the monitor 135, and the viewer is not aware of or distracted by the running marks. However, if the medium is copied using a reproduction unit 136, the unauthorized copy 138 so produced will contain not only the original video stream (movie), but also the running marks identifying the playback unit 134, original disk issued by the institution and time of play. The unauthorized copy may be played into a mark extraction system 122, preferably retained at the institution, for tracing to the copyist. The mark extraction system 122 reads the contents of the running marks at block locations obtained from mark storage system 132. Appropriate decoding of the contents of the running marks will be used to trace to the source of the unauthorized copy.

The running marks preferably comprise blocks of pixels distributed strategically in the video stream within selected frames, but running marks do not appear at the same location in successive frames, to avoid perceptibility by the viewer. The running mark positions in a frame correspond to message hole locations, defined by place holder sectors. The marks themselves may represent a logic "1" or "0" depending upon whether the pixels at the message hole location are changed from the original image content or not. This standard could be reversed or encoded in a different format, such as in quad rather than binary data. As one example, if a message hole contains a block of pixels changed from the original image content of the block, that message hole may be decoded as a logic "1"; if the pixel block corresponding to the message hole location is not changed compared to the original image at that location, the message content may be decoded as a logic "0". These logic 1's and 0's are read successively, within the frame and then frame by frame to assemble the complete message corresponding to the source of copying.

Figure 2:
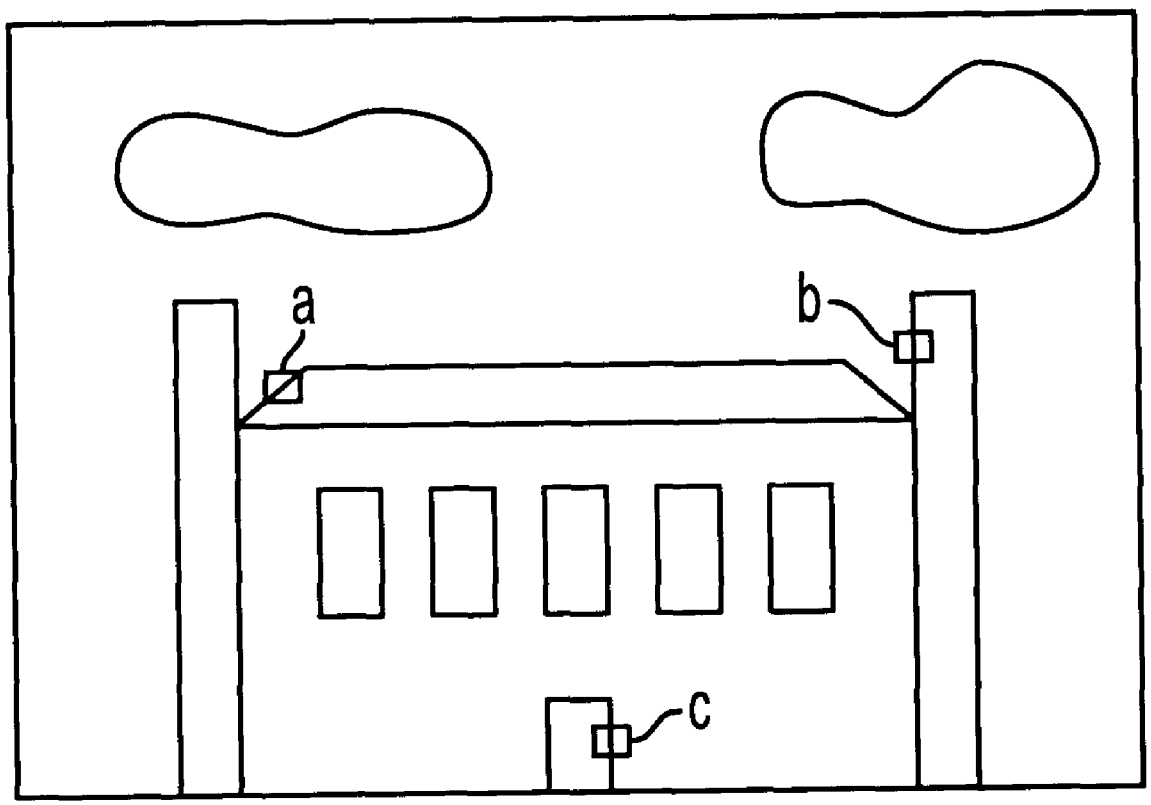
FIG. 2 shows an image with three message holes for carrying a source-of-copying message.

FIG. 2 shows an image corresponding to one video frame, with message hole locations a, b and c that may be located in the frame either manually by an operator, or automatically by machine based upon prescribed image attribute criteria, so as not to be visible to a viewer. Transitions or textured regions, such as the boundaries of the image shown, are good selections. If the content of block a is changed from the original image, it may be decoded as a running mark of value "1"; otherwise as a mark of value "0" if the mark a in the frame is identical to the original image. What is important is that the locations of the message holes are stored, and contents of the pixel blocks at those locations, representing the running marks, compared to the original image at the same locations to determine whether the running mark represents a changed image or not for valuation. It is to be understood, however, that other encoding criteria could be used to determine the value of a running mark, for example, using two or more differently changed running marks to designate binary or other type of data.

Figure 3:
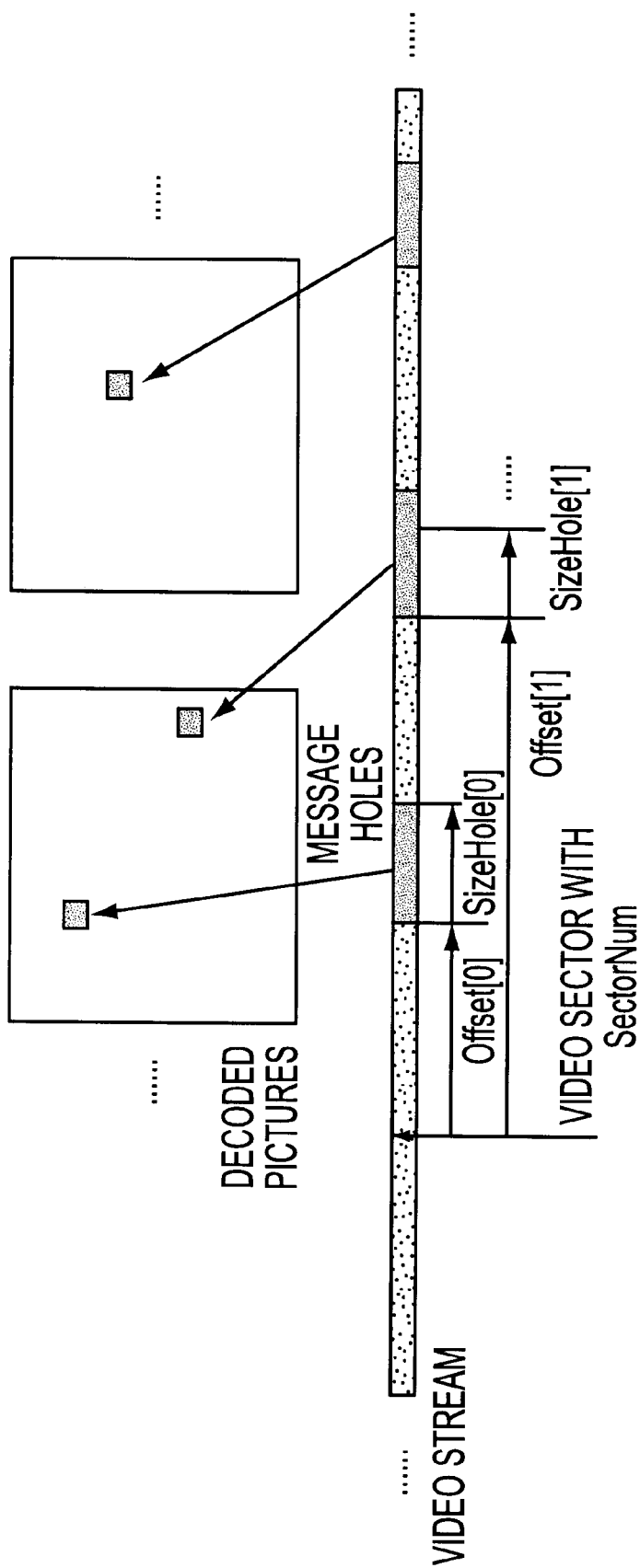
FIG. 3 is a diagram showing message holes embedded in a video stream.

FIG. 3 depicts message holes in an MPEG bit stream. For each message hole, bit size and location offset with respect to some reference location are stored in the sub-picture channel of the recording medium The MPEG bits corresponding to source of copying are pre-encoded and stored in the sub-picture channel. During encoding of running mark (RM) data at the playback unit 134, the serial numbers of the playback unit and medium, and time of play, are read and the bits in the message holes of the incoming MPEG bit stream are replaced by the MPEG bits corresponding to this source of copying information. Any number of bits may be designated to each message element, with range suitably defined to accommodate the number of playback units and media issued by the institution. Bits corresponding to these elements are serialized to form a bitstream that will identify playback source each time a medium is played.

2. Running Mark System

As summarized previously, the message embedded in the video stream using running marks preferably will contain one or more of the following fields: (1) serial number of playback unit, (2) serial number of recording medium (e.g., DVD), and (3) time of playback describing the source of copying. Each running mark message is made up of a prescribed number of bits, for example, 128, that, when concatenated, comprise the source-of-copying identification fields.

Figure 4A:
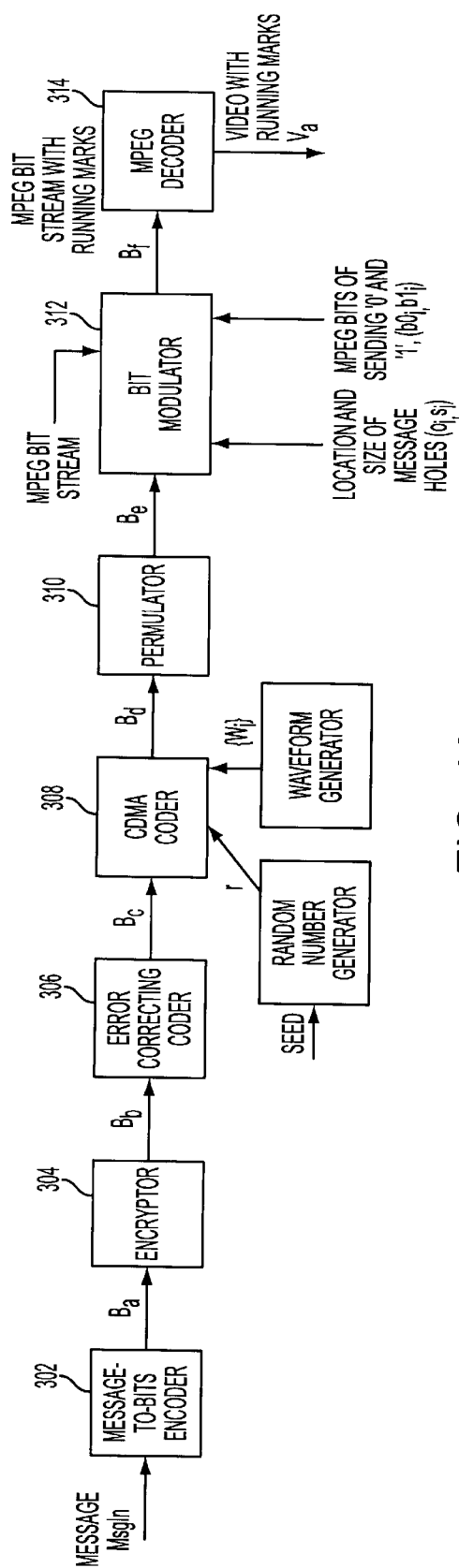
FIGS. 4(a) and 4(b) are block diagrams of a running mark system encoder and decoder, in accord with the invention.

The manner by which the source-of-identification message is encoded and inserted into the MPEG video stream is shown functionally in FIG. 4a. The message, produced at the playback unit 134 (FIG. 1) in real time when a recording medium is played for viewing (or unauthorized reproduction), termed MsgIn in FIG. 4a, is applied to a message encoder 302. This encoder 302 converts all fields of a message to a bit stream $B_a$ according to the allocated number of bits for each field (playback unit serial number, disk serial number, playback time). The serial number of the playback unit is advantageously read from a read only memory (ROM) within the playback unit, since the playback unit serial number does not change. The serial number of a disk is read directly from the disk during playback. The playing time is obtained from a system clock within the playback unit. All bits are concatenated to form bit stream $B_a$.

Advantageously, the source-of-copying message may be inserted into the video stream of a DVD or other medium multiple times in succession. This is possible because the number of frames available for message data in a DVD far exceeds the storage requirement of data necessary to identify the copy source. To help enhance the security of the message, the format or content of each insertion may be made to differ. For example, the coding of each of a number of successive entries, all representing the same identification information, may be stored in a different format that is recognized by the institution's decoder.

In the best mode, only one bit of data is embedded in each message hole. However, variations are possible within the scope of the invention. For example, two or more bits of message data can be carried in a single message hole, encoded in any appropriate way. Alternatively, a single message bit may be distributed among two or more message holes.

As still another possible variation, running marks may be embedded into a video stream directly, rather than into an MPEG bitstream. That is, each pixel or a number of selected pixels of a frame may be directly encoded with message bits. This may be carried out by, for example, varying the intensity of the pixel with respect to the original, to designate a prescribed logical value. A practical implementation of this technique is provided by a PN sequence of data represented by pixels in which the intensity of each is increased or decreased to represent a logical value 1 or 0, respectively.

2.1. Message Encryption

The bit stream $B_a$ is applied to an encryption unit 304, where heavy encryption is implemented to protect the message, designating reproduction source, and to thwart a copyist from creating a false but legal message as a manner of compromising the system. Preferably quintuple encryption using the Data Encryption Standard (DES) algorithm associated with 128 bit pre- and post permutation is adopted to encrypt message bit stream $B_a$, as shown in FIG. 5. First, the bits of $B_a$ are scrambled by a 128 bit permulator $P_{s0}$ 320, and the result is split into a left part $B_{al}$ and a right part $B_{ar}$.

Each part consists of 64 bits, and is encrypted five times using DES with keys $K_0$ to $K_4$, each key being 64 bits in length. The left and right parts then are merged, and the result post-scrambled to create output bit screen $B_b$ using a permulator $P_{S1}$ 322 of length 128.

Alternatives to DES as the encryption engine include public-key cryptosystems relying on number theory, finite field structure and algebraic coding theory, such as RSA, McEliece, ElGamal and elliptic curve algorithms. A new encryption algorithm, proposed by Xuejua Lai and James Massey in 1992, called IDEA (International Data Encryption Algorithm) is a good candidate for encryption.

2.2. Error Correction

The output of encryptor 304, $B_b$, a 128 bit bitstream, is applied to an error correcting coder 306 to correct for distortion inevitable in tape or disk reproduction technologies. Distortion may arise from processing of digital to analog conversion, source recording, disk manufacturing and tape or disk duplication. Copyists may attack the running mark system of this invention by intentionally distorting their video sources. To ensure the embedded running marks can be recovered, heavy error correction coding (ECC) preferably is implemented. Various ECC algorithms and hybrid systems can be used. In order to achieve a high error correcting capability while requiring a small amount of computation for encoding, a concatenated ECC system preferably is adopted, shown in FIG. 6a and FIG. 6b. In this ECC system, the 128 bit input bit stream $B_b$ is encoded into a 256 bit bitstring $B_{c1}$ using a shortened Reed-Solomon (32, 16) coder with 8-bit symbols. The resultant bit stream is encoded by a convolutional encoder of ½ and a constraint length K=7 to produce a 528-bit output bit stream $B_c$, as shown in FIG. 6a. Since there is only one code word of 32 symbols in this encoding process, speed is high and bit interleaving not required between coders.

Reed-Solomon (RS) codes are a special subclass of generalized BCH codes. A normal (n, k) RS code defined in aGalois field $GF(2^m)$ has code words of length $n=(2^m-1)$ symbols, where m is a positive integer. Each symbol consists of m bits. This code has a minimum distance of (n−k+1) and can correct up to $t=\lfloor(n-k)/2\rfloor$ symbol errors. The number of parity-check symbols is (n−k). The generator polynomial g(x) of the code is $$g(x)=(x-\alpha)(x-\alpha^2)(x-\alpha^3)\ldots(x-\alpha^{2t}),$$

where $\alpha$ is a primitive element in $GF(2^m)$. Let $m=(m_0, m_1, \ldots, m_{k-1})$ be a k-symbol message block with the corresponding polynomial m(x), i.e. $m(x)=m_0+m_1x+m_{k-1}x^{k-1}$. Let $c=(c_0, c_1, \ldots, c_{n-1})$ be an n-symbol RS code with the corresponding polynomial c(x). Then a (systematic) RS encoding algorithm consists of the following two steps:
1. Divide the product of m(x) and $x^{n-k}$ by g(x). Let $d(x)=d_0+d_1x+d_{n-k-1}x^{n-k-1}$ be the remainder.
2. Set $c(x)=x^{n-k} m(x)-d(x)$, i.e. $c=(-d_0, -d_1, \ldots, -d_{n-k-1}, m_0, m_1, \ldots, m_{k-1})$.

The above polynomial calculation is performed in $GF(2^m)$, and can be implemented effectively using shift-registers. In many applications including the ECC for CD and DVD players, since the allowed code length is less than the natural length n=(2m−1) symbols, a shortened RS code can be used. Let S be the subset of code words in an (n, k) RS code whose j rightmost coordinates in the code word have the value zero. Then a (n−j, k−j) shortened RS code is formed by deleting the j rightmost coordinates from all the words in S. The same shift-register encoder of the original RS code can still be used to encode this shortened RS code. For decoding, if the deleted coordinates are treated as erased positions, the same original shift-register decoder with erasure decoding can be used. (An erasure is a symbol that indicates a received symbol value is in doubt). Alternatively, the approach of replacing deleted coordinates as zeros is used in this invention.

For the RM system of this invention, a shortened RS (32, 16) code in $GF(2^8)$ is used to code the 128-bit message. Each symbol is 8 bits in length. The coder can correct up to t=8 symbol errors. The primitive element $\alpha$ is a root of the primitive polynomial $P(x)=1+x^2+x^3+x^4+x^8$. For decoding an RS code effectively, aBerlekamp-Massey shift register algorithm can be used.

A convolutional coder convolutes an input bitstream with multiple impulse responses to produce ECC bits. FIG. 7 shows a convolutional encoder with a rate ½ and a constraint length K. Let $x=(x_0, x_1, x_2, \ldots)$ be the input bitstream and $(g^{(0)}, g^{(1)})$ be two impulse responses for the coder. Then the encoding bitstream $y=(y0^{(0)}, y0^{(1)}, y1^{(0)}, y1^{(1)}, y2^{(0)}, y2^{(1)}, \ldots)$ is obtained by the following discrete convolution.

$$y_i(j) = \sum_{l=0}^{K-1} x_{i-l} g_l^{(j)},$$

where j=0, 1. For decoding the convolutional code, a Viterbi decoder can be used. For a concatenated error correcting system, the convolutional coder has a constraint length K=7 and a rate ½. Its impulse responses are $g^{(0)}=(1011011)$ and $g^{(1)}=(1111001)$.

2.3. Spread Spectrum Coding/CDMA

Copyists may attempt to attack the running mark system of this invention by combining video outputs from multiple playback units. In this manner, the embedded running marks may become distorted, and recovering the source of copying message difficult. Hence, in accordance with an aspect of this invention, code division multiple access coding (CDMA) unit 308 is implemented to enable separate decoding of running marks produced by multiple playback units, even in the presence of noise. CDMA is a class of modulation that uses specialized codes to provide multiple communication channels in a designated spectrum. The CDMA standard is described in an article entitled "North American Cellular CDMA," Hewlett-Packard Journal, December 1993, pages 90–97, incorporated herein by reference. An advantage of using CDMA to encode running marks is predicated on the property that different playback units will encode bits to be added to the MPEG video stream using different low correlation waveforms. During decoding, the sending bits of a playback unit are recovered by performing inner products of received waveforms with an associated waveform Since the correlation among these waveforms is low, the inner product processing can directly extract the sending bits even if the receiving waveforms are formed as a combination of output waveforms from different playback units.

Preferably, pseudo-random noise (PN) sequences are used for CDMA coding, in accord with an aspect of the invention. These PN sequences, used in spread spectrum multiple access applications, behave like random noise in the time domain, and have good properties of signal hiding and interference rejection in the frequency domain. Another kind of waveform that can be used is a set of binary orthogonal waveforms. Orthogonal waveforms are advantageous because their correlation is the lowest, i.e., 0, which makes bit extraction performance better. A preferred type of binary orthogonal waveform for this purpose is the set of Hadmard-Walsh (HW) waveforms, obtained by selecting rows of an HW matrix in a known manner.

However, a large number of playback units will be required to be assigned unique waveforms. If each playback unit uses a different waveform, the required length of HW waveforms becomes impractical, and the problem of bit extraction with unknown waveforms impossible. If multiple playback units share a common waveform, copyists may use these playback units to create video sources from which running marks may not be recovered. A solution to this problem per the invention is to select, for each disk player, one waveform randomly from a set of waveforms during run time. This is advantageous because the probability that all disk players of a copyist would pick the same waveform during run time is low. Also, waveforms are picked randomly for each copy of running marks in a movie, and for each time the same or different movies are played. Since there are only a small number of different waveforms, the bit extraction process can determine the sending bits by trying all of them and selecting those with the highest inner products. Fast HW transforms are available for this purpose.

To help prevent copyists from attacking the CDMA subsystem if they determine what waveforms are used, the CDMA waveforms are scrambled using permutation, and more than one waveform used to send a bit stream. To preserve the orthogonal property, waveforms are permuted among different columns first and then among different rows. Tables 1 and 2 (Tables are attached in appendix 1) show Hadmard-Walsh waveforms of length 8, and those after column and row permutations. The scrambled HW waveforms are either read from the prerecorded disk or pre-stored in a ROM, that is, no computation is required during run time. For using multiple waveforms, they should be selected properly so that for the same bit location of a bit stream, the waveforms are different for different playback units.

Figure 8:
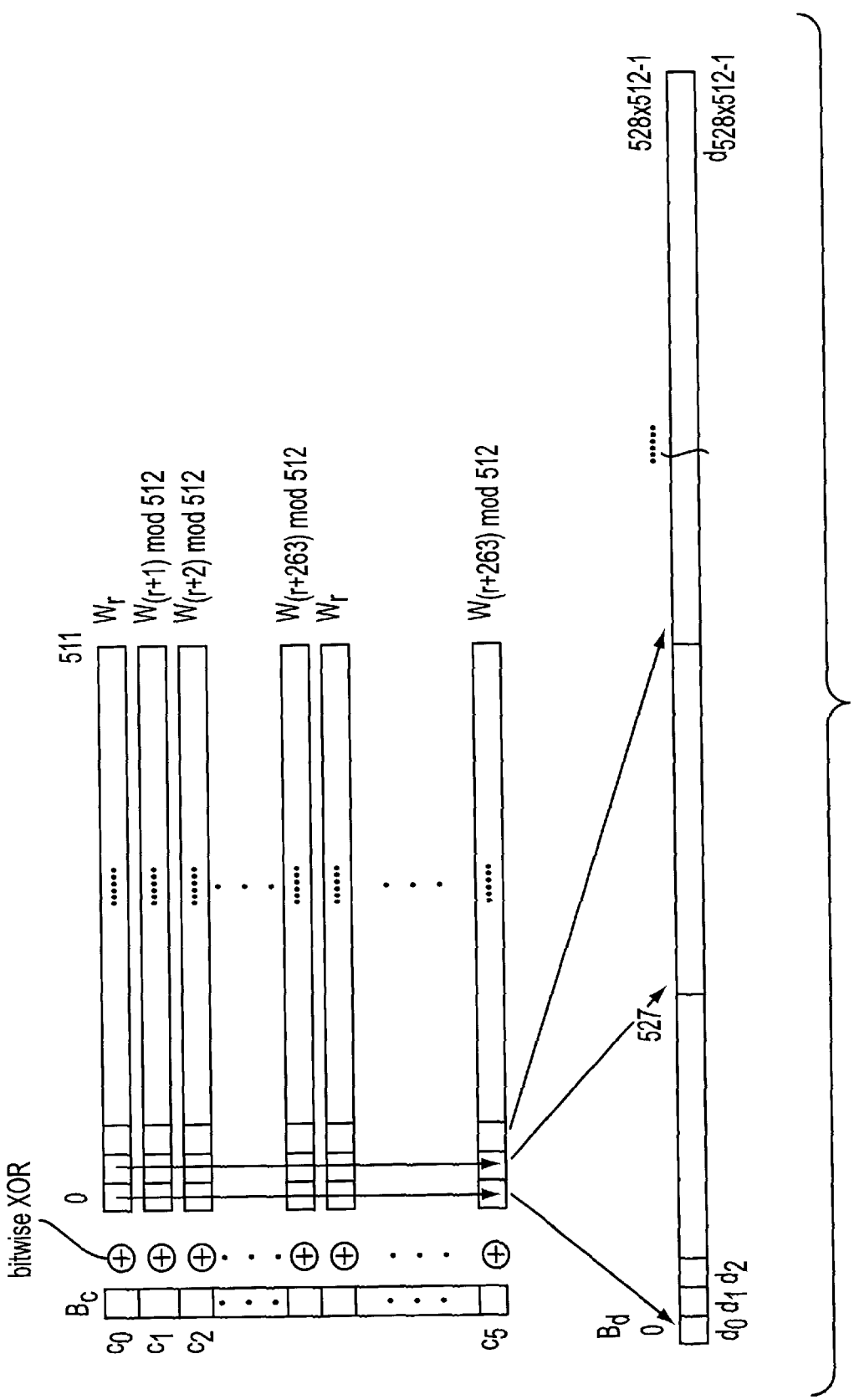
FIG. 8 is a diagram depicting a CDMA encoding process, implemented in an embodiment of the invention.

The CDMA coding process is shown more comprehensively with reference to FIG. 8, wherein first a number between 0 and 511 is generated randomly, and the 264 consecutive HW waveforms with column and row permutations are selected. These waveforms perform bit wise operations of exclusive OR with the first and second half parts of the bit stream $B_c$ to create an output bit stream $B_d$ of length 528×512. The bits of bit stream $B_d$ are formed in a column order, in order to avoid burst noise.

2.4. Scrambling

In order to have higher security of sending bits, a permulator of multiple variable length permutation (MVLP) is used to scramble the CDMA bit stream. In FIG. 9a, bits of the CDMA bit stream $B_d$ are permuted to form a bit stream $B_e$ in permulator 310 with the same length by using a number of permulators having different lengths. Eight permulators of maximum length 256 may be used, as shown in FIG. 9b. An example of permulator $P_0$ of length 7 and its inverse is given in FIG. 9c. For processing the last permutation, the number of remaining bits may be less than that of a permulator. "Don't care" terms are padded to full the gap. After permulation, normal bits are scanned from the result and sent out. During the process of depermulation, in decoder 400, in unit 406, the sending bits are inserted in proper locations before performing inverse permutation. FIG. 9d and FIG. 9e show an example of these processes using the permulator of FIG. 9c. The above permutations can be combined with the CDMA encoding process described previously. The required temporal storage space before sending bit stream $B_e$ is 256 bits instead of 528×512 bits. The permulated bit stream $B_e$ is supplied to bit modulator 312 which embeds one or more transmitted bits into the final video output by modifying the incoming MPEG bit stream. These bits are recovered by bit demodulator 404 in the decoder (FIG. 4b), by processing the received video.

2.5. Bit Modulation/Demodulation

Referring again to FIG. 4a, the bit modulator 312 embeds one or more transmitted bits of the bit stream $B_e$ into the modified MPEG bit stream $B_f$ by changing bit stream of message holes of the incoming MPEG bit stream. This bit stream $B_f$ is applied to MPEG decoder 314 that outputs video bearing running marks. For each message hole, its size and location offset with respect to some reference location are stored in the sub-picture channel of a DVD disc. ARM Carrier is defined as MPEG bits in a MH (as well as the corresponding pixel values of that MB) of sending RM bits. The MPEG bits of these carriers are pre-encoded and also stored in the sub-picture channel. During RM encoding, the MH information and these carriers are read, and the bits in message holes of the incoming MPEG bit stream replaced by the carriers according to the sending bits. To reduce the required data space of storing these carriers, one of the carriers is pre-stored in the MH of MPEG bit stream. A MH can transmit n bits if there are $2^n$ different RM carriers in that MH. In the best mode, there are two carriers for each MH, i.e. only one carrier is stored in the sub-picture channel.

Figure 4B:
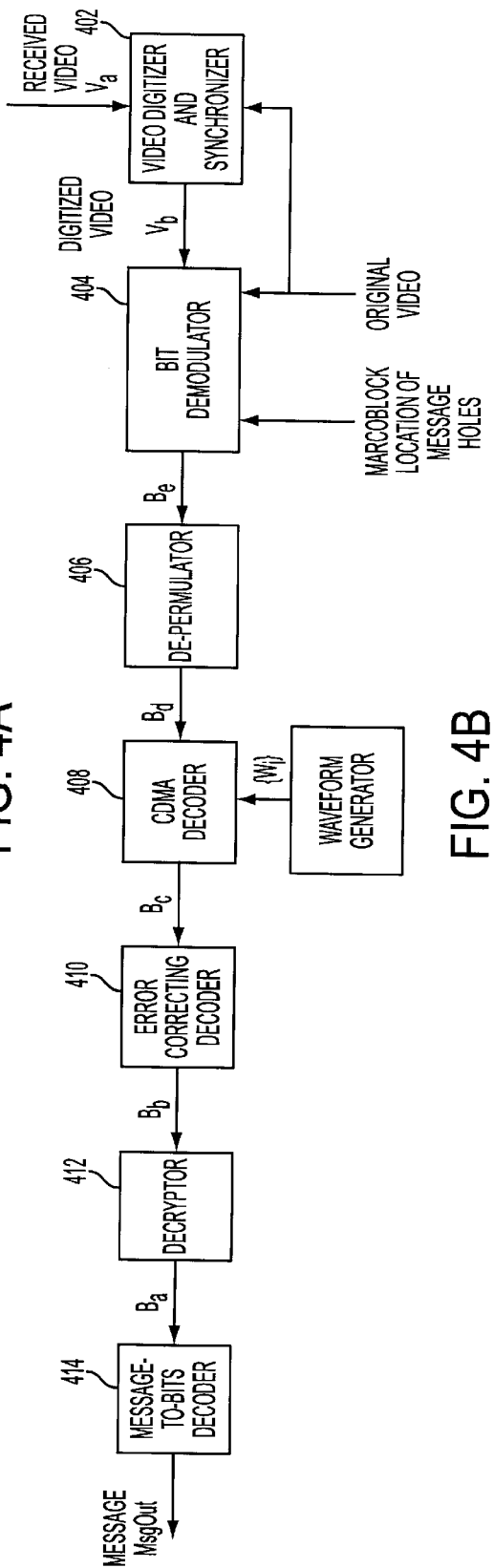

The bit demodulator 404 in FIG. 4b recovers the bit stream $B_e$ by processing the received video. The received video can be obtained from other sources, such as any DVD playback unit, from a VHS tape player or from the internet. Proper demodulation, such as NTSC demodulation, and format conversion are performed in video digitizer unit 402 before running mark decoding. The video digitizer 402 digitizes the incoming video using a high quality A/D converter. The channel compensator aligns the digitized video with the original video and compensates the channel error by using conventional frame registration and channel equalization techniques.

Still referring to FIG. 4b, bit demodulator 404 receives the digitized video bit stream $B_b$, together with the original video and block or macroblock location of message holes distributed among the video frames. Bit demodulator 404 compares the digitized video stream $V_b$ with the original video, as the two videos (the reference video and video under test) are playing back simultaneously, and compares the contents of the block or macroblock of the video under test defined by each message hole location stored in the reference video. If, for a message location, the original (reference video) and digitized video block or macroblocks in the video under test indicate a change of image, the bit demodulator generates a logical "1"; if the original and digitized video blocks or macroblocks at the message hole location in the video under test are the same, the bit demodulator 404 generates a logical "0", as a bit stream $B_e'$. This bit stream $B_e'$ is depermulated (descrambled) in unit 406, decoded by unit 408, error corrected by unit 410 and decrypted by unit 412 prior to conversion to a source-of-copying message in decoder 414. Units 406, 408, 410 and 412 perform the reverse functions of their counterparts 310, 308, 306 and 304 in FIG. 8, respectively.

3. RM Carriers Generation

The RM carriers should be designed carefully so that they are hard to be seen by normal consumers, hard to be detected and removed, and robust enough to enable the sending message to be recovered. The available storage space for the RM carriers and MH information is limited. It affects the total number of available transmitted bits and the recovery performance of RM message. Another constraint is that the total number of MPEG bits with RM carriers should be equal to that of the original DVD bit stream from the movie post house at some levels. Otherwise, problems of buffer overflow and underflow of MPEG decoding may occur, and effort is required to edit the bit stream in different DVD sectors to keep navigation and other DVD information of the original DVD disc unchanged.

There are different levels of keeping the total number of bits unchanged that will impact the carrier design. The simplest level is to change a single bit or a few bits, e.g. changing the sign bit of motion vectors or DCT coefficients, and changing quantization scaling factors. Another level is to keep the total number bits of a MB unchanged, e.g. replacing DCT coefficents with those having same number of bits, or changing multiple DCT coefficients to have a total number of bits the same. The major advantage of these two approaches is that the size of carriers is small in general, and that in some cases, carriers do not require additional storage space for them. However, these approaches tend to have large, and hard to control, video distortion, low message recovery capability, and/or small number of MBs suitable for MHs. Preferably, the number of bits of a carrier is made larger (or smaller) than that of original MB. Bit stuffing is used to make the size of all carriers of a MH the same, as well as the case of carriers being smaller in size than those of the original. To ensure that the changing MPEG bit stream is legal, a new slice header is inserted after the MB of that MH. The total extra number of bits is compensated by MPEG re-encoding all MBs in the same row so that the total number of bits of that row is the same. The re-encoding process will be discussed in more detail later.

Figure 10A:
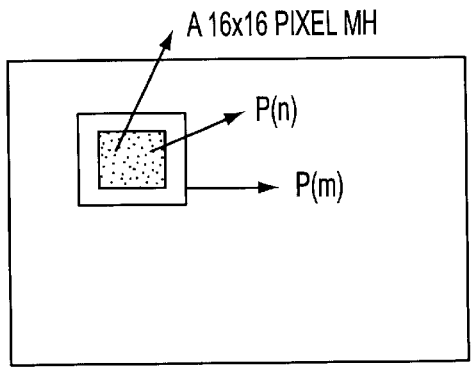
FIGS. 10(a)–(d) show variations on bit encoding per the invention.

Transitions at the edges of a macroblock can be softened, so as not to be so visible, by varying the intensity of pixels surrounding the MB. As shown in FIG. 10a, for example, the pixels p(m) surrounding a given pixel p(n) are modified by a small amount of distortion to establish a transition region.

Figure 10B:
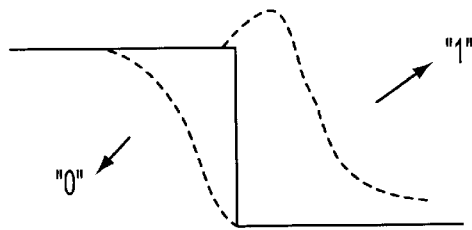
Figure 10C:
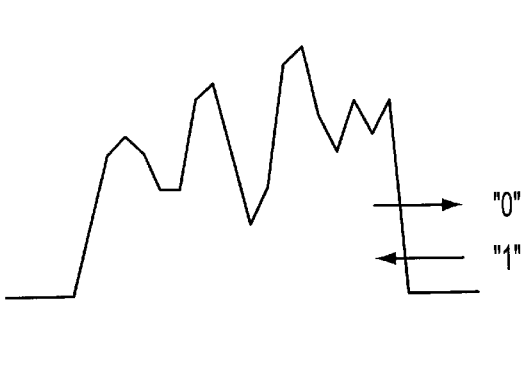
Figure 10D:
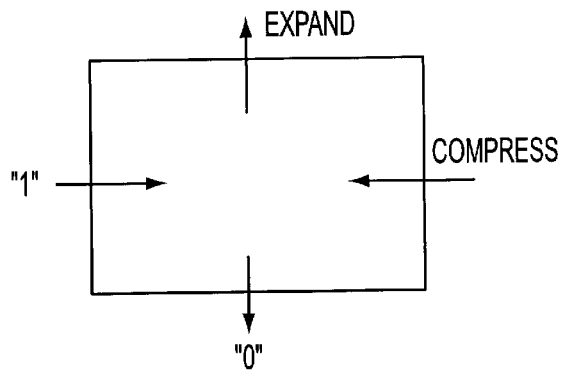

In this invention, the basic strategy of generating RM carriers is to add or to change the intensity of video sources. Approaches include (1) adding some noise to the video, (2) changing intensity along edges, and (3) changing image characteristic in texture areas. Other possibilities, however, include designating a change of state of bits at prescribed message holes to indicate one binary value and a non-change at that location to indicate the other binary value, flipping between pixel and half-pixel accuracy of motion vectors, modifying the quantization scale factors of each macroblock, and changing one or more DCT coefficients of luminance and/or chrominance blocks. Still other possibilities include (4) Modifying the image edge profile of a MB in various ways corresponding to message bits of prescribed logical value (FIG. 10b depicts edge profiles of increased and decreased magnitudes, designating data of first and second logical values), (5) Shifting the texture of an image by a pixel, or more or less than one pixel, to designate data of a prescribed logical value, as shown in FIG. 10c, and (6) Expanding or compressing the texture of a macroblock to designate data; see FIG. 10d.

MB alteration in these and other ways to define the bits of a message is advantageously performed at textured portions of the image so as not to be visible. There are other possibilities as well; what is important is that the parameter which is varied to designate a logical value should be reliably detectable (robust) but must blend into the image.

Figure 11:
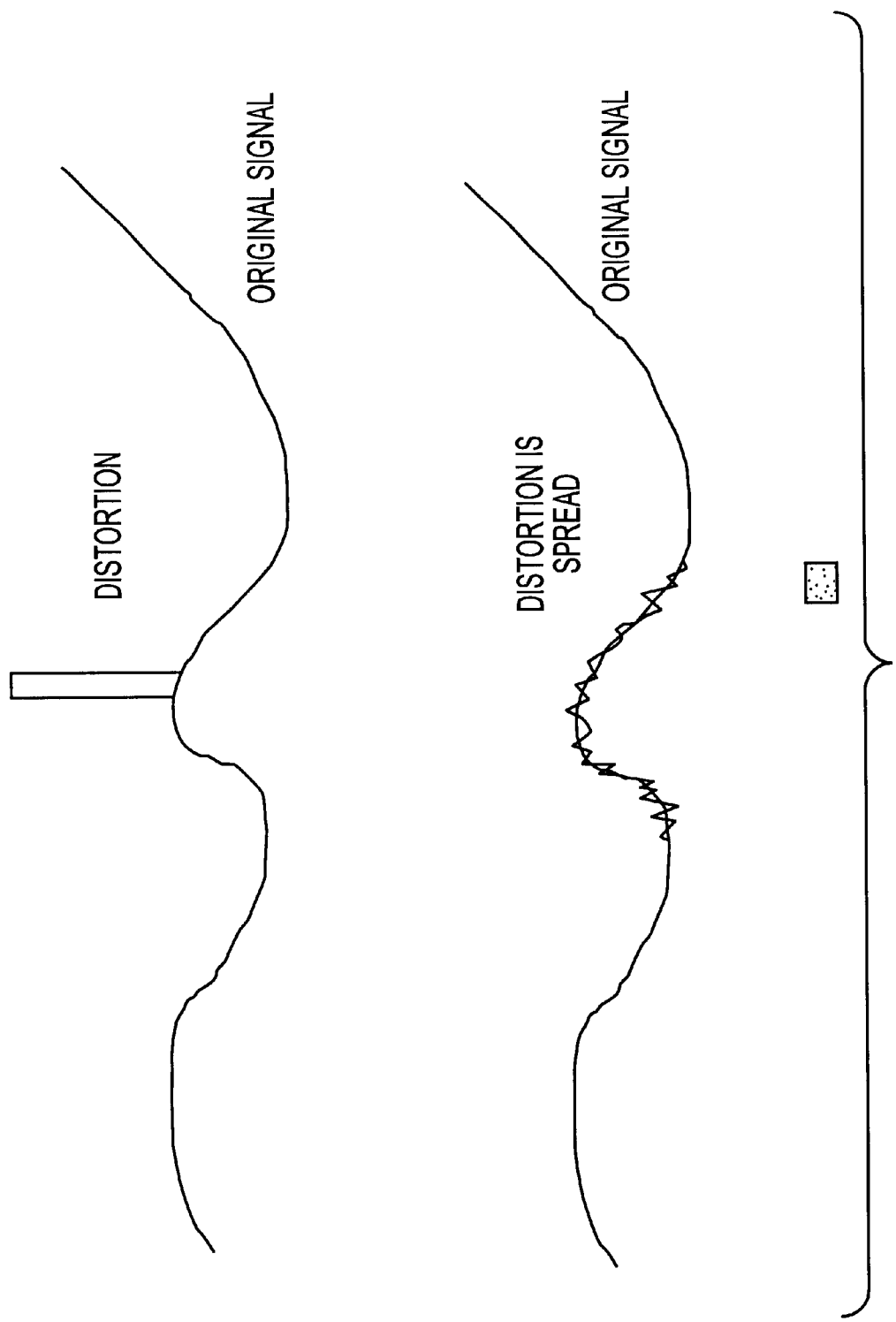
FIG. 11 shows spreading of the original signal waveform by adding a noise component to the DCT carrier coefficients, in accord with an aspect of the invention.

Adding noise to video for modulation of running marks produces the advantages of low distortion and difficulty of detection by a copyist. As illustrated in FIG. 11, for the same amount of distortion, noise-like carriers spread out distortion within a MB, and consequently, the distortion for each pixel becomes small and virtually invisible. Since noise naturally arises in a video source, such as from camera and film, detection of noise-like carriers is difficult even using frame subtraction.

In the invention, a DCT approach of changing the first nDCT AC coefficients of each DCT block of a MH is used to generate RM carriers and is described in FIG. 12. The array MHBlock [0][block] is used to store all the original DCT blocks of the MH (without RM). The arrays MHBlock [1][block] and MHBlock[2][block] are used to store the blocks after adding noise to form replacements 1 and 2. Then the carriers 0 and 1 can be selected from the original, and these two replacements. First, an array of nDCT elements is generated randomly. These elements have the value either 0, 1 and 2 with some ratio, e.g. 50% for 0 and 25% for both 1 and 2. For generating the replacement 1, if the element is 1 and 2, the corresponding DCT coefficient is added and subtracted by a fixed value of sigma respectively. For generating the replacement 2, the addition and subtraction is exchanged. If the element equals to 0, then both carriers use the original DCT values. The values of nDCT and sigma for luminance and chrominance blocks can be different. An example of this approach is given in FIG. 13, with a typical noise pattern in pixel domain for the luminance blocks with the parameters of nDCT=40, sigma=5, and the ratio of 0, 1 and 2 as 2:1:1.

4. Bit Modulation Inplementation in a DVD Player Environment 4.1 General

In a DVD player environment, the implementation of the bit modulator 312 in FIG. 4a is described in more detail as follows. Assume that there are a total of NumBits bits in one copy of $B_e$ in FIG. 4a These bits are stored in array Bits[ ] pointed by a pointer BitsPtr. When the last array element of Bits[ ] is reached, the first element is used for the next bit to be sent. Note that more than one copy of RM bits may be embedded in a movie. The number of copies depends on the available RM space on a DVD disc.

The data for replacing the video stream of MHs, the size and location of MHs, and the processing parameters are stored in sectors called RMG_PCK within the DVD's VOBUs. The data layout and data structure of RMG_PCKs are shown in FIG. 14 and Table 3 through Table 5.

Figure 14:
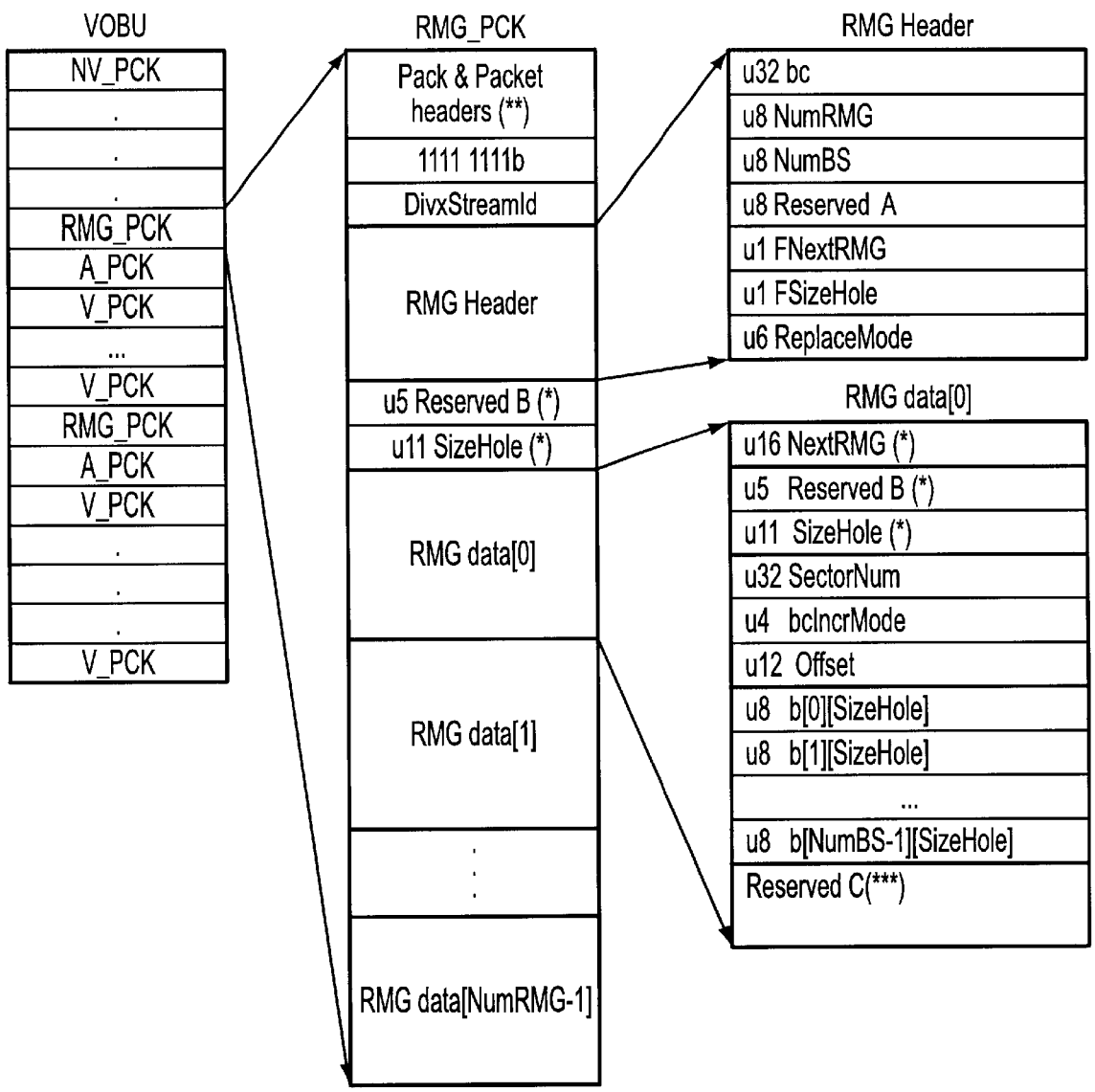
FIG. 14 is a diagram of the layout and structure of a running mark data stream.

In FIG. 14, a RMG_PCK is stored physically before any V_PCKs which contain message holes to be modified by that RMG_PCK. It is not required that these V_PCKs should be in a VOBU in which the RMG_PCK occurs. In FIG. 14, a RMG_PCK is a DVD private_stream_1 pack whose packet is encoded as a provider defined stream. The stream_id and sub_stream_id of the packet are equal to "1011 1101b" and "1111 1111b," respectively, which is described in Tables 5.1.1-1 and 5.1.1-2 on page VI5-6 of the DVD video specification 1.0. The pack and packet headers are defined in VI5-9, section 5.2 of DVD specifications. The DivxStreamId specifies different Divx applications and is defined in Table 3. If the DivxStreamId is equal to "00000001b", the run-time module replaces the bit stream of message holes for any DVD packs except navigation packs according to the algorithm and data structure described in this specification. The rest of a RMG_PCK consists of a RMG header, Reserved B, SizeHole, and RMG data. Note that all data in a RMG_PCK should reside within a sector, i.e. no data is allowed to cross a sector boundary.

Different variables of a RM header and RM data respectively are shown in FIG. 14. Their purpose is summarized in Table 4 and Table 5. The RM header provides global information about RM algorithms and parameters used by all running markings within a RMG_PCK. The NumRMG is the total number running markings in the RMG_PCK. Each running marking uses one RMG data. The variable ReplaceMode determines an algorithm with proper parameters to be used for replacing the bitstream of a message hole.

Data layout and data structure of running marking data stream. (a) Data layout of RMG_PCK in a VOBU. (b) Data layout of a RMG_PCK. (c) A RMG header. (d) RMG data [0]. Variables marked with (*) may not exist. () Pack and packet headers follow DVD specifications in section 5.2 of VI5–9. (*) This reserved area should not exist unless FNextRMG=1. In the case of FNextRMG=1, the NextRMG has to be used for the location of next RMG data.

Figure 15:
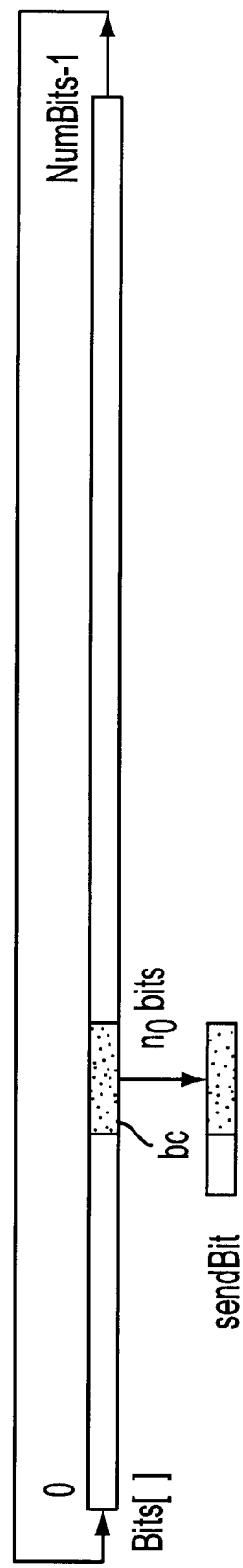
FIG. 15 is a diagram depicting bit extraction performed on a DVD signal stream per the invention.

The bc points to the first bit to be sent for a RMG_PCK in the RMG bit array Bits[ ] as in, for example, FIG. 15. When a RM is finished, the bc value is updated for the next RM according, to the following formula (other relationships for other situations can be applied):

$$bc=bc+bcIncrValue. \qquad (4.1)$$

Table 6 is a look up table to determine the above bcIncrValue value from the bcIncrMode of each RM. For a new RMG_PCK, the bc value is used to resynchronize the bit to be sent. Since RMG bits are stored in Bits[ ] of data type u16, a proper bit extraction is needed to obtain the transmitted bit pointed to by bc. Let $n_0$ be the number of bits to be sent for a running marking. It is defined as the smallest integer which satisfies the following condition:

$$_2n0 \geq (NumBS+1), \qquad (4.2)$$

where NumBS specifies the total additional number of bitstreams b[ ] in RM data to be used for replacing a message hole. It is required that there is at least one additional bitstream datum in a RM data and the value of (NumBS+1) should be a power of 2, i.e. NumBS>0 and $n_0$>0. Note that the values of bcIncrValue and no can be different. The location of the message hole in a V_PCK is determined by the logical sector number SectorNun and the u12 Offset of a RM data. In order to have good run-time performance, all sector numbers within a RMG_PCK are assumed to be in non-decreasing order. The Offset specifies the number of bytes between the message hole and the beginning of the physical sector pointed by SectorNum, including the physical sector, pack, and packet headers. Note that the numbers of additional bitstreams for all RM data in an RMG_PCK do not change in order to reduce the overhead of the RM data. The size of a message hole is determined by SizeHole. If the size of all message holes in an RMG_PCK do not change, the flag FSizeHole in the RMG header is set to 0, and only one Reserved B and one SizeHole are sent after the RMG header. Otherwise, each RM data contains a Reserved B and a SizeHole. Note that only one message hole is processed for one RM in this example.

The NextRMG is used to jump directly to the next RM data in a RMG_PCK by skipping the Reserved Area of RM data without any calculation during run time. The Reserved Area is used for future development. The NextRMG is the offset in bytes from the beginning of a RMG_PCK to that RM data. For the last RM data, NextRMG is set to zero. If the flag FNextRMG in the RM header is set to 1, each RM data contains a NextRMG and it is required that these NextRMG values are used to go to the next RMG data. If FNextRMG=0, there is no Reserved Area for each RMG data, and the NextRMG is calculated.

The algorithm in FIG. 16 shows conceptually the process of running marking during run time. The real implementation depends on the constraints of different playback units. The RunTimeModule ( ) process in line 3 of FIG. 16 continues to read in data packs of VOBUs during run time until the end of the DVD's data stream is reached (or other interrupts occur). The routine readSector ( ) in line 8 returns the next data pack from the VOBUs and the routine readFromSector in line 9 returns the value of a specific variable of this data pack. The stream type of a data pack is determined by the variable StreamId. If a data pack is either a video stream or an audio stream, i.e. a V_PCK, A_PCK, or other audio packs, it is decoded and the result is sent to the video or audio port for display. For other pack types, their corresponding processing proceed. The running marking process starts when a RMG_PCK is read in, i.e. that data pack is a provider defined stream (of a private stream 1) and its DivxStreamld is equal to "00000001b". Then a RMG header is read as in line 26. If the size of message holes does not change, i.e. FSizeHole=0, a SizeHole is read as in line 28. All running markings for this RMG_PCK are performed in line 12 by calling a routine RunningMarking ( ) for each video sector. If there are errors in these processes, proper error action is triggered.

The routine RunningMarking ( ) in line 48 performs running marking by applying the RM data referencing to the current video pack. The NextRMG of the location of the next RM data is either read from the RMG_PCK or calculated depending on the flag FNextRMG. If FSizeHole is set to be 1, the SizeHole field is read. After that, the sector number, the bit count increment mode, the offset of the message hole, and the additional bitstreams b[ ] are read. When a sector number matches the current video sector number, the routine ReplaceMessageHoleData ( ) of line 66 is called to replace MH bits according to the ReplaceMode. Before moving the next RMG_Data structure, the bc is updated using bcIncrMode.

The routine ReplaceMessageHoleData ( ) in line 74 performs different ways of replacing MH bits according to the variable Mode. For the case of Mode=0, the MH bits are replaced by b[0 ]. For the cases of Mode=1 or 2, a sendbit is formed by extracting $n_0$ bits from Bits[ ] pointed to by bc as described in FIG. 15. For the case of Mode=1, the MH bits are replaced by b[sendbit-1]. For the case of version=2, the $n_0$ least significant bits of sendbit are reversed, e.g."0000 0101" becomes "0000 0010" for $n_0$=3. Then the MH bits are replaced by b[sendbit-1]. If the Mode value is not on the list, no replacement is performed.

In order to prevent a crash of the run-time module firmware and minimize the video distortion due to an error in a RMG PCK, proper checking should be performed in the implementation. If there is an error, no MH bits are replaced and the process is moved to the next running marking.

4.2 Running Mark Place Holders—Running Mark Packs

A running mark pack (termed "Divx pack" herein) is a DVD private_stream_1 pack whose packet is encoded as a provider defined stream The stream_id and sub_stream_id of the packet are equal to "1011 1101b" and "1111 1111b," respectively, which is described in Tables 5.1.1-1 and 5.1.1-2 on page VI5-6 of the DVD video specification 1.0. In the sub-picture data area, which is immediately after the sub_stream_id, there are 64 bits equal to"0x 4449 5658 312e 3023" in hex. These bits represent the character string "DIVX1.0#". The remaining bits of the packet are set to 0.

The Divx packs are distributed evenly in the DVD bit stream at the Divx pack frequency, which is determined according to the following formula:

$$Ndivx=truncate\ ((MovieLength/(15*factor))+0.5),$$

where Ndivx is the number of MPEG encoded video frames that are to be sandwiched between Divx packs. MovieLength is the play length in minutes as specified by the title author. The factor is 1.0 for NTSC and 1.2 for PAL. If the computed value of Ndivx is less than 2, Ndivx will be set to 2. Divx packs are physically (not temporally) located with respect to video packs. A collection of Ndivx encoded video frames is referred to as a Divx video group. A Divx pack occurs physically before the associated video pack that contains the first byte of the Divx video group. Consequently, a Divx pack appears before the first video pack of the DVD. Note that the presentation of the Divx pack is temporally independent of its associated video packs. The presentation time of a Divx pack can occur temporally before or after an associated Divx video group.

Figure 17:
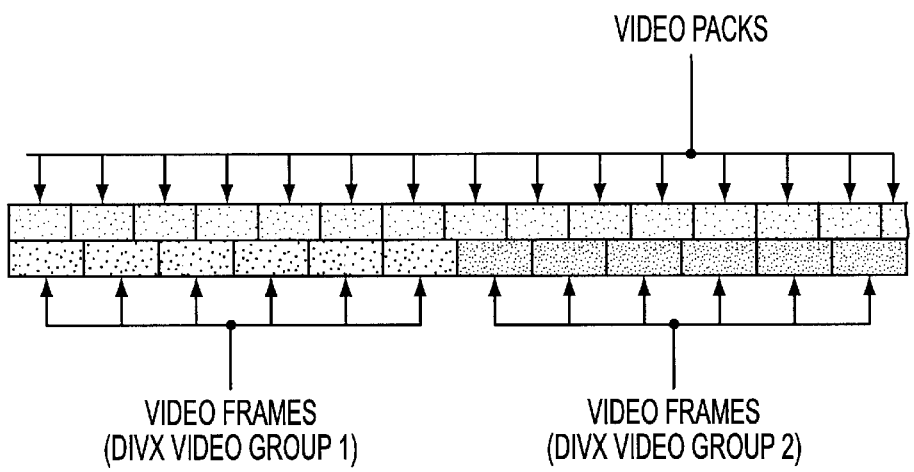
FIGS. 17 and 18 show the layout of video groups before and after insertion of Divx marks per an aspect of the invention.
Figure 18:
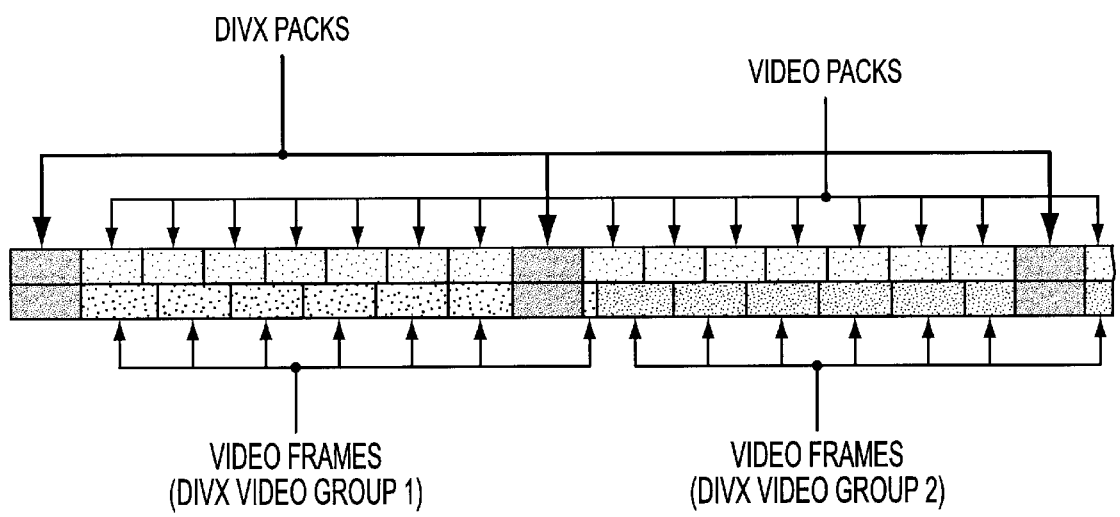

To illustrate the calculation of Ndivx, suppose there is an NTSC movie with a length of 85 minutes. From the formula, Ndivx is 6. Therefore, the Divx packs are inserted into the DVD bit stream every six encoded video frames and a Divx video group contains six video frames. Assume that each encoded video frame takes 1.2 video packs and a Divx video group consists of 7.2 video packs. The layout of the video groups without Divx packs is illustrated in FIG. 17. Note that part of the last video frame from Divx video group 1 exists in the same pack as the first video frame from video group 2. The layout of the video groups and the Divx packs after the insertion of the Divx packs is depicted in FIG. 18. Note that the Divx pack for group 2 precedes the pack containing the first byte of encoded video for group 2, even if video for group 1 in the same pack exists.

It is required that a DVD disc image created with Divx packs pass MEI verification. The Divx packs are valid private_stream_1 packs. This implies that the pack contain a valid SCR and Divx packets contain the required values as defined in VI5-29 and 30 of the DVD video specification. The PES_Scramble_Control field is set to "not scrambled." The Original_Or_Copy field is set to "original." Each Divx pack is required to contain a valid PTS. This PTS value is not required to have any relationship to the PTS values of video. There is no PES private data followed by the PTS data, except for the first pack in a VOB, which is required by Note 2 on page VI5–30 of the specification.

It is not required that the Divx packs are physically adjacent their associated video packs. Navigation, Audio, or other Sub-picture packs can occur between a Divx pack and its associated video pack. It is not required that a Divx video group is fully contained in a Block, PGC, VOB, Cell, or VOBU. A Divx video group can span these various boundaries. A Divx video group can be re-started at the beginning of a new VOB.

Title authors can choose between enabling or disabling the creation of Divx packs. This creation is disabled by default. If the creation of Divx packs is enabled, title authors can specify the movie length in minutes for calculating Ndivx. If the movie length entered by title authors is less than 15 minutes or greater than 240 minutes, a confirmation message appears and the title authors can accept or reject the entered value. The title author can overwrite the computed Ndivx which is determined from the entered movie length. The value of MovieLength is not updated for the new value of Ndivx. The value of Ndivx can not be specified as less than 2 or greater than $2^{30}-1$. An error message appears if the overwritten value of Ndivx is not valid and the change is aborted. If the creation of Divx packs is enabled, the title author must specify either the movie length or Ndivx.

5. Message Holes Generation and Re-distribution

In the RM system, some of the MBs comprising a video serve as MHs. A method for selecting the MBs which become MHs is needed. This selection is not crucial to the RM system. The information (message) can be represented and recovered using virtually any configuration of MBs as MHs. Consequently, many techniques for selecting MHs potentially could be employed.

In the preferred embodiment, selection of MHs is comprised of two phases: 1) an initial selection of candidate MHs (message hole generation) followed by 2) a final selection of MHs from these candidates (message hole redistribution). This two phase approach is employed because, for several reasons, it is desirable to have a roughly consistent number of MHs in each B frame. In message hole generation (the first phase), ore candidate MHs are selected than needed. In redistribution (the second phase), some candidate MHs in B frames with excess candidates are discarded in such a way that the final number of MHs per B frame is relatively consistent. Candidates can also be discarded for various other reasons to be described the next few sections.

In the present implementation of the RM system the total number of MHs that can be placed in a movie is limited by the reserved space in the sub-picture channel, the size of the MHs, and the computational capacity of a DVD player for inserting RMs into the video in real-time when the DVD is played. The average number of MHs per B frame typically is less than 12. Some considerations for MH placement are: (1) the locations of MHs should not be predictable, (2) MHs should be distributed more or less evenly among frames, and (3) when RMs are inserted into the MHs, the MHs should be difficult to see and detect. MH locations should not be predictable because e.g. it would be easier for a movie pirate to tamper with the transmitted information (message) if the MH locations are known or predicted. MHs should be distributed more or less evenly among frames so that the computational capacity needed to insert RMs into the MHs in real-time is more or less constant. In addition, if a large number of MHs were placed in a single frame or a few frames, a significant amount of information could be lost or removed by deleting these few frames. After RM insertion, the MHs should be difficult to see (or, at least not very noticeable) by a viewer of the video so that the quality of the video is not too adversely affected by the RM system. Also, if the MHs are easily seen, it is easier to tamper with them.

One approach is to select the required number of MHs in each frame manually or semi-automatically. For instance, a computer program could display each B frame comprising a movie and a trained operator could use the program to select the MBs to be used as MHs. This approach would have the advantage of using human vision and human insight for selecting the MHs, e.g., so that the MHs are in places where they are less likely to be noticed. Such an approach is expensive, time consuming, and tedious because there are many frames to be processed. For example, there are 158, 400 frames in a 110 minute movie. Thus, automatic MH generation becomes important. One approach, in accord with the invention, generates MHs randomly using a random number generator. In order to reduce MH visibility, another approach first classifies all MBs of a frame as either smooth or non-smooth (textured), and then randomly selects MBs within the textured class as MHs. These two approaches are discussed in sections 5.1 and 5.2, respectively.

5.1. Random Generation of MHs

A requirement of generating MHs is that their locations should not follow a predictable pattern. This requirement can be satisfied by placing the MHs randomly using, e.g., a pseudo-random number generator to pick the MH locations. In this implementation, a fixed number of candidate MHs are randomly located on each row of MBs comprising a frame. For instance, if the desired number of candidate MHs per row is 3, the algorithm places 3 MHs on each MB row, but the horizontal location of the MHs is randomly assigned using a pseudo-random number generator with a uniform distribution. For each MB row, the algorithm keeps a list of those MBs that have already been selected as candidate MHs so that no MB gets selected twice and every row has the target number of candidate MHs (e.g., 3). For example, if the pseudo-random number generator by chance selects the same MB a second time, the MB is found in the list of candidate MHs, and the algorithm repeats the pseudo-random selection process until a MB is found that is not in the list. Once all the MHs in a frame have been selected, they are sorted into ascending order by MB address (MBA), because some other algorithms in the RM system need to process the MHs in this order.

A pseudo-code representation of the algorithm is provided in FIG. 19. The parameters of the algorithm are denoted Width, Height, nFrames, numMHrow, and seed. The value of Width and Height specify the size of a frame in pixels. The number of candidate MHs generated for each MB row in a set of frames is numHMrow. The nFrames parameter specifies the number of frames to be processed. The list of MB addresses of the candidate MHs, MHAlist, is the output of the algorithm.

For the algorithm of gMHrow in FIG. 19, the values of Width, Height, nFrames, numMHrow, and seed are obtained. Then the number of MBs in a MB row, MB_Width, is calculated and numMHrow is limited to a range of 0 to MB_Width, where MB_Width is the number of MBs in a MB row. The pseudo-random number generator is initialized with the seed number specified by the seed parameter. MHs are generated for each row of each frame by using a pseudo-random number generator which returns a random integer in the range of lowMBA to highMBA. The algorithm makes sure that no MH is repeated within a frame. Then all the MBAs in MHAlist are sorted into ascending order and output.

5.2. Message Hole Generation with Region Classification

Another, more sophisticated, strategy for selecting MHs is to identify regions in a video where humans can tolerate video distortion and then place the MHs in these regions. This strategy can be implemented by dividing picture frames into different regions according to their spatial, temporal, brightness, and/or color characteristics. Currently, MBs are classified into smooth and non-smooth (textured) classes. MBs that are classified as textured are selected randomly as candidate MHs. These two processes are described in the following paragraphs. Since it is generally accepted that human vision is more sensitive to the distortion in a smooth area than in a non-smooth area, no MHs are placed in smooth areas.

Similar to the approach of Chun et al., "An Adaptive Perceptual Quantization Algorithm for Video Coding", IEEE Transactions Consumer Electronics, 39(3): 555–8, August 1993, classification is performed using the DCT coefficients of the luminance blocks of MBs in two steps. The algorithm for classification selects a MB in the picture frame randomly. If the picked MB satisfies some criteria that are described in subsequent paragraphs, it is then classified as either smooth or non-smooth (textured). If the MB is classified as textured then that MB is considered to be a candidate MH. This process is repeated until the requested number of MBs are selected or there are no more texture blocks left in the frame (i.e., all the textured MBs have been accepted as candidate MHs).

One of the criteria that a MB must satisfy before being classified is that it must not lie on the boundary of a frame. In this instance, the boundary is considered to be the outer rectangle of MBs consisting of the first and last rows of MBs and the first and last columns of MBs. There are two reasons for excluding these MBs from consideration. First, these MBs often are reproduced with particularly low fidelity by inexpensive analog recording equipment such as a consumer VCR, Consequently, it is difficult to extract the RM information from these areas in a recording made with such equipment. Second, these areas are not displayed by many television sets, i.e., they often fall outside the displayed area of the picture frame. These MBs could be replaced, e.g., by a black region, which would effectively remove the RM information lying in these regions without adversely affecting the viewing of the video.

Another criterion that a MB must satisfy is that the majority of the pixel luminance (grayscale) values must fall within an acceptable range of values. The 256 (16×16) pixel values are obtained by decoding (decompressing) the MB. For instance, it might be decided that no more than 25% of the pixel luminance values can be outside the range of 25 to 230. hn this case, if more than 64 of the pixel values were less than 25 or greater than 230, the MB would not be classified and would not be considered as a candidate MB. The percentage of pixel values and the range of acceptable luminance values are parameters of the algorithm which can be adjusted as necessary and are not limited to the values provided in this example (25%, 25, and 230). The particular values used in the current implementation have been determined by experimentation and engineering judgement. The motivation for this criterion is that excessively bright or dark pixels often get clipped (increased or decreased in value, respectively) by MPEG re-encoding (described subsequently) or by analog recording, e.g., by a consumer VCR Because it reduces the range of pixel values, this clipping effect can adversely affect the ability to recover or extract the RM information.

Still another criterion that the MBs must satisfy is that the MB in the same location in the previous frame must not have been selected to become a MH. This criterion tends to prevent MHs from being placed in the same location in adjacent frames. RMs which appear in the same locations tend to be more visible (more noticeable).

The classification of a MB as smooth or textured is accomplished by first classifying the four luminance blocks comprising that MB. These four classification results are evaluated and combined to determine the classification of the MB. Suppose that the horizontal, vertical, and diagonal energies of a DCT block are denoted Eh, Ev, and Ed, respectively. The value of Eh is calculated by summing the squares of the DCT coefficients indicated by an 'h' in the following template:

|   |   |   |   |   |   |   |   |
|---|---|---|---|---|---|---|---|
| . | d | h | h | h | h | . | . |
| d | d | h | h | h | h | . | . |
| v | v | d | d | . | . | . | . |
| v | v | d | d | . | . | . | . |
| v | v | . | . | . | . | . | . |
| . | . | . | . | . | . | . | . |
| . | . | . | . | . | . | . | . |
| . | . | . | . | . | . | . | . |

Similarly, the values of Ev and Ed are calculated by summing the squares of the elements marked with a 'v' and a 'd' respectively. Each location in the template represents one element of the 8×8 matrix of DCT coefficients comprising a luminance block. The upper left DCT coefficient in this template is the DC term Let Ea be the average of the horizontal, vertical, and diagonal energies of the block. It is computed as the average of Eh, Ed, and Ev. Then a block is classified according to the following rule:

```
if (Ea < T1)
    The block is a smooth block;
else
    The block is a texture block;
```

Ea is used to classify blocks as smooth or non-smooth. The threshold value of T1 may be determined by a series of experiments and by using engineering judgement. Its value remains fixed. However, the threshold value (T1) may be determined automatically based on the characteristics of the video or a portion of the video and it value might change from time to time, e.g., a different value of T1 might be used for every frame.

A MB is classified from the classifications of the four luminance blocks which comprise it according to the following rule:

```
if (3 or 4 blocks in the MB are texture blocks)
    The MB is a textured MB;
else
    The MB is a smooth MB;
```

The pseudo-code for the above mentioned classification routine is given in FIG. 20. The pseudo-code for the initialize function called by the classification routine is given in FIG. 21. Initially, all MBs are considered to be available for classification. Then the locations of the MHs selected in the previous B-frame are marked as unavailable to the current frame. This prevents MHs from appearing in the same location in adjacent B-frames. Another constraint in the selection of MHs is that no MHs should be put along the border of a frame; these MBs also are marked as unavailable. The classification routine processes only a pre-specified proportion of a frae, i.e., the number of MBs that are examined is restricted to a maximum limit. By restricting the percentage of the B frame that is searched, the percentage of MHs that are picked as candidate MHs is reduced. Hence, the probability of two MHs appearing in the same location on adjacent frames is reduced because the regions that are searched are determined randomly and tend to be different from frame to frame. If the required number of MHs are not found, the algorithm exits.

After the initialize routine is called, the search for MHs in the given B frame begins. The algorithm terminates if there are no more MHs available in the frame or if the requested number of MHs have been found. The row and column of a MB are calculated from the MBA, which is selected randomly. MBs are not chosen if most of the luminance pixel values are not within a specified range. Then the MB is classified. The pseudo-code for the MB classify function (Classify_MacroBlock) is given subsequently. If the MB is classified as textured, the MB is marked as picked. If the number of MHs on a row is equal to the maximum number allowed per row, no more MHs are taken from that row. This restriction is needed by the re-encoding process. If the MB is classified as smooth, it is not used.

Given in FIG. 22 is the pseudo-code for the classification of a MB. After the DCT of the 8×8 block is computed, the high frequency energy components in the DCT matrix are computed as horizontal, vertical, and diagonal energies, Ev, Eh, and Ed, respectively. The average of the three values, Ea, is computed. The number of 8×8 blocks classified as texture are counted. If 3 or 4 blocks are textured, the MB is classified as textured; otherwise, the classification is smooth.

5.3. Redistribution of Message Holes

The second (and final) phase of MH selection is redistribution. The objective of redistribution is to distribute the MHs among the frames more or less uniformly. It is desirable to place a consistent number of MHs in each frame so that there is no clustering of MHs in a few frames. This distribution results in an approximately constant computational burden during real-time RM insertion by the DVD player. Also, if many MHs are placed in few frames, a substantial amount of information could be removed by deleting these few frames. In redistribution, the number of MHs per B frame is held approximately constant by discarding some candidate MHs from B frames which have excess candidates.

Figure 23:
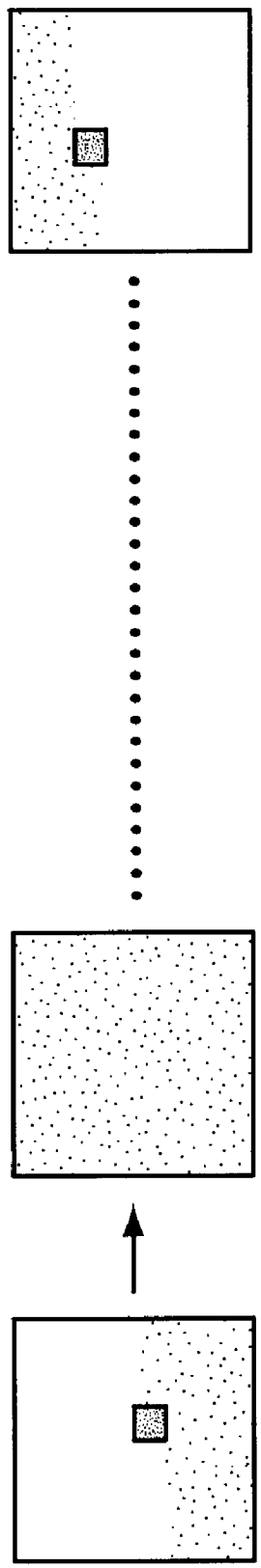
FIG. 23 shows a diagram of a typical frame section being processed.

The redistribution algorithm processes the video in contiguous groups or segments that are referred to as sections. A section corresponds to a grouping of video as it is stored on the DVD. A section can begin and end at almost any point in the video. This situation is illustrated in FIG. 23. In this example, the section begins at a particular MB (the small black square on the left) in a frame. It continues for the remainder of that frame, all of several more frames, and part of another frame (the gray area) and ends at certain a MB in the last frame (the small black square on the right). A section can begin or end on any type of frame (I, P, or B).

In the current implementation there is a limited amount of auxiliary storage on the DVD allotted to the RM system. Currently, this limit is 2 Kbytes per section. Because of this limitation, MHs for which the associated auxiliary storage is smallest (least) are preferred over MHs which need more auxiliary storage. In this discussion, the size of a MH is considered to be the size (in bits) of the auxiliary storage associated with a MH. Redistribution tends to process MHs with a smaller size before MHs with a larger size.

The basic concept for redistribution is uncomplicated. For each B frame in the section, select the smallest MH from the set of candidate MHs for that frame to be a final (non-discarded) MH. Remove these final MHs from the set of candidate MHs so they will not be selected again. Continue this procedure until the auxiliary storage (e.g., 2 Kbytes) has been exhausted or there are no more candidate MHs. If the auxiliary storage is exhausted, the remaining candidate MHs are discarded (not used). This procedure tends to give a relatively consistent number of final MHs per B frame, at least within a section. Of course, if there are few candidate MHs associated with a particular B frame, e.g., because that frame consists principally of smooth MBs, it is possible for a B frame to contain few or no candidate MHs and, in that case, it will contain few or no final MHs.

Several refinements of the basic concept are needed to make it function well in a practical case. One such refinement is related to the arrangement of MHs when the auxiliary storage is exhausted. Suppose there are five B frames (denoted 'a' through 'e') in the section and that the auxiliary storage is exhausted after the third B frame ('c'). The number of final MHs in each B frame might be as follows:

| B Frame   | a | b | c | d | e |
|-----------|---|---|---|---|---|
| No. of MHs | 7 | 7 | 7 | 6 | 6 |

There are 7 MHs in the first three B frames and 6 MHs in the last two B frames. A preferable arrangement would be as follows:

| B Frame   | a | b | c | d | e |
|-----------|---|---|---|---|---|
| No. of MHs | 7 | 6 | 7 | 6 | 7 |

When the auxiliary storage is exhausted (after 'c'), the algorithm "backs up" to the state it was in when the B frame 'a' was last processed. At that time, there were 6 MHs assigned to each B frame. A candidate MH is selected from each of frames 'a', 'c', and 'e' to yield the preferred arrangement. If a frame is encountered that has no more available candidate MHs, adjacent frames are considered, moving outwards in both directions until an available MH is discovered.

Another refinement to the basic concept is concerned with the partial frames that can occur at the beginning and end of a section (see FIG. 23). If the first and/or last frames of a section are B frames, it may be necessary to process a partial B frame. In this case, the number of MHs selected for the partial B frame is prorated according the proportion of the B frame that lies within the section. For example, if 40% of the area of a B frame is within a section, the number of MHs selected for that partial frame should be 40% of the number that would be selected for a full frame.

The pseudo-code of the algorithm is given in FIG. 24. All the variables are initialized in the initialize( ) function. The initialize( ) function is depicted in FIG. 25. If the start of a section lies on an I-frame or a P-frame, the first B-frame that follows the I or P frame is chosen as the start frame and the first MB of the frame is taken as the starting MB of the section. Similarly if the section ends in an I or P frame, the last B-frame in that section becomes the last frame of the section.

If a section lies in the middle of a B-frame, a part of that frame is processed in the previous call with the previous section. For the next section, this information has to be to stored so that the MHs selected in the previous section are not selected again. An MH along the DVD boundary may not be used for redistribution.

After initialization, (see FIG. 24), redistribution begins. The first while loop terminates if no MHs are available or if the size of selected MHs exceed the maximum size per section (e.g., 2 Kbytes). The smallest sized MH from each frame is found and selected as a final MH.

After the initial redistribution is done, the MHs selected in the last iteration have to be redistributed again. The MHs selected in the last iteration are removed. Other MHs are selected in a more uniform arrangement. After all the MHs are selected, they are output from the algorithm.

6. MPEG Re-encoding

The objective of MPEG re-encoding is to keep the total number of bits for MBs in a row with one or more MHs, after RM insertion, equal to that before RM insertion. The extra bits of MHs are compensated by having fewer bits for MBs in that row. Let the number of bits of original encoding and re-encoding be OrigNumBits and RowBitCnt for that row. Let their difference be BitsDiff as $$BitsDiff=OrigNumBits-RowBitCnt \quad (6.1)$$

An approach to making a MB that uses fewer bits for encoding, in accord with the invention, is to increase its quantization scaling factor mquant. In general, the higher the Mquant of a MB is, the fewer bits it will use, but the larger distortion it will have. Thus, changing mquant values of MBs properly can, in general, make the RowBitCnt less than or equal to the OrigNumBits, i.e. BitsDiff<=0. Bit stuffing then can be used to make them equal. Slightly fewer bits for bit stuffing may be achieved by further adjusting the distortions of some DCT coefficients of MBs, although computational complexity will be increased.

Since the increasing amount of mquant of each MB is unknown, iteration searching is required for re-encoding. This iteration searching will be terminated if the condition of BitsDiff<=0 is satisfied, the number of iterations reaches an allowed number defined as iterMax or the increase in the original mquant values goes beyond the maximum allowable distortion value MquantIncMax. For the latter two cases, all MHs in that row are removed and no MB in that row will not be used for sending RM message bits. In order to spread distortion uniformly among MBs, the mquant values of MBs are increased by a similar amount. To speed up the re-encoding process, all the necessary encoding information is extracted by decoding the MPEG bit stream for the rows containing one or more MHs. This information includes the motion vectors, the MB type, the coded block pattern, the original mquant value, the motion and DCT types, and a decision of MBs being skipped or not. If there is no MH in a row, the re-encoding process for that row is skipped and its original MPEG bit stream is used.

To help determine the re-encoding status during each iterative pass, the program uses and updates the variable iterStatus which is defined in the Table 7. The iterStatus Inc_delta_Row and Inc_Mquant_Row are used to indicate to the program to increase the mquant values of all MBs in the row by a selected value delta or 1 respectively. Similarly, iterStatus of Dec_delta_Row and Dec_Mquant_Row are used to indicate to the program to decrease the mquant values of all MBs in the row by a selected value of delta or 1, respectively.

6.1. MPEG Re-encoding Techniques

Figure 26:
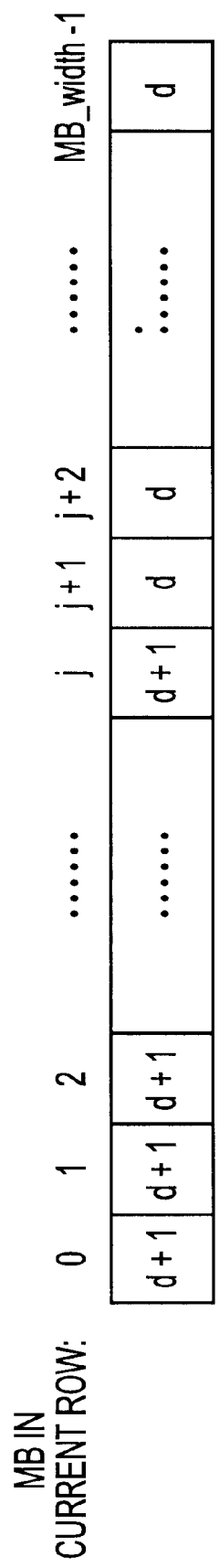
FIG. 26 shows increasing value of Mquant for macroblocks in a current row to compensate for extra bits of message holes.

In accord with a first embodiment of re-encoding in this invention, a MB is selected, its mquant value is increased by one, and the whole row is re-encoded. If termination conditions discussed above are satisfied, the iteration process stops. Otherwise, another MB is selected and the iteration process continues. Note that mquant value will be kept for each iteration and will not be reset to the value before iteration. Since for MPEG encoding, the mquant value of a MB is encoded and sent only if it is different from that of the previous MB, selecting MBs of a row consecutively is used. When the last MB in that row is reached, the first MB will be chosen again for the next selection. FIG. 26 shows a typical result of this iteration process. The mquant values of first (j+1) MBs are increased by a value of (d+1) and that of the rest of the MBs are increased by a value of d, where MB_width is the total number of MBs in a row.

An algorithm of this approach is presented in FIG. 27. As in line 6, for each MH row of the current frame, the mquant value of selected MB in the row (one at a time) is increased sequentially by 1. After each re-encoding pass, if the condition of BitsDiff<=0 is not satisfied, the next MB in that row is selected as in line 21. An advantage of this approach is ease of implementation, but it requires a large number of iterations.

In a second embodiment, the variable iterStatus in Table 7 is first set to be Inc_Mquant_Row. For each iteration, the mquant values of all the MBs within the row are increased by delta and the whole row is re-encoded. Assume that the value of delta is 1. This process continues until BitsDiff<=0. Then iterStatus is set to be Inc_Mquant_MB, and the mquant values are reset to that of previous iteration by subtracting the delta Next, starting from the first MB of that row, the first approach is used until BitsDiff<=0. The iterStatus is then set equal to Final_Iteration and a final iteration is performed through the iterative loop to send out the video and bit stream data of the MHs.

An algorithm describing the second embodiment of this aspect of the invention is given in FIG. 28. The variable iterStatus is first set equal to Inc_Mquant_Row as in line 3. For each pass, the mquant values for all the MBs within the row are then increased by the step size delta as in line 7, until the number of bits needed to encode that row becomes less than the target bit rate. However, to make the re-encoded row size as close as possible to (but less than) the original size of the row, the present mquant values of all the MBs in that row are then decreased by delta as in line 25, and iterStatus is set equal to Inc_Mquant_MB as in line 26. Next, starting from the first MB within that row as in line 27, the mquant value of each MB is changed one at a time as in the first embodiment until the number of bits required to encode that row becomes less than the target bit rate. At this point, the iterStatus is set equal to Final_Iteration, and a final pass is performed through the iteration loop to send out the video and bit stream data of the MHs.

Although the second embodiment requires more processing, the saving of iterations compared to that of first approach is substantial. LetNumIter(i) be the number of iterations for i-th approach. For the first embodiment, it can be shown that $$NumIter(1)=1+d\times MB\_width+(j+1)+1 \quad (6.2)$$

$$NumIter(2)=1+(d+1)+(j+1)+1 \quad (6.3)$$

The first iteration, in both embodiments, is for the initial pass using the original mquant values for the MBs, and the last iteration is for the final pass to send out the video and bit stream data of the MH. Thus, the saving of iterations using second approach over first approach is given by $$NumIter(1)-NumIter(2)=d\times(MB\_width-1)-1 \quad (6.4)$$

For a frame of 720×480 pixels, there are 45 MBs in a row. For a typical MPEG video, d=4. For this case, it saves 175 iterations.

A third embodiment for MPEG re-encoding, in accord with the invention, is a further refinement over the second embodiment, where the value of j in FIG. 26 is calculated by comparing the bit difference of all MBs in the row between current and previous iterations. Then the re-encoding is switched to first embodiment using the mquant values of MBs in the row (in FIG. 26) directly instead of starting from the first MB in the row. Since the estimate of j is quite close to the actual one in general, the additional number of iterations to reach the condition of BitsDiff<=0 is very small such as one or two iterations. The saving of iterations of the third approach over the second approach depends on the value of j. Since j can be any value between 0 and (MB_width-1), the saving on average becomes MB_width/2. Again, for a frame of 720×480 pixels, there are 45 MBs in a row. It implies that the saving will be about 22 iterations.

Let Bi (k) be the number of bits of encoding i-th MB in the k-th iteration. Note that the summation of Bi (k) over all MBs is equal to RowBitCnt of the k-th iteration. For the increasing mquant values in FIG. 26, it can be shown that after (d+2) iterations, the condition of BitsDiff<=0 will occur. Let PrevBitCnt be the previous RowBitCnt, i.e. the RowBitCnt of (d+1) iteration. Then j can be determined as shown in FIG. 29.

An algorithm describing the third embodiment is presented in FIG. 30. This algorithm is similar to the algorithm of second embodiment, the principal difference being that in lines 26–28, the value of j is calculated as previously described. The mquant values of MBs are decreased by delta from j-th MB instead of the first MB as in the second embodiment. Then the j-th MB is selected to be the next MB for increasing the mquant value.

6.2. Identification and Removal of Unsuitable Message Holes During Re-Encoding

During the re-encoding process, some "unsuitable" MHs which should not be used for inserting the message bits are also determined and/or eliminated, in accord with another aspect of the invention. MHs will be identified and/or removed for the following four reasons.

DVD sector boundary: If a Message Hole in a row lies on a DVD sector boundary after re-encoding, it is identified and this information is reported to the second process GenRmgPck. The original MH is treated as two separate MHs but a flag is used to indicate that the two MHs correspond to the same message bit. This is because, in a DVD disc, the MPEG video is divided into DVD sectors each of 2K bytes. Thus, for a MH lying on a DVD sector boundary, that MH would be broken up into 2 different DVD sectors, and hardware implementation becomes more complex and costly for RM insertion.

Re-encoding fail: If during re-encoding of a row, it is found that it is not possible to compensate the additional bits of MH(s) from the other MBs within that row after a reasonable number of tries, no MH will be inserted to that row. Otherwise, problems that existed before re-encoding, such as buffer underflow or overflow during MPEG decoding, may occur.

Weak RM carriers: If the difference between the video data of the RM carriers 0 and 1 after re-encoding for a given MH is very small, this MH will not be used. The purpose of this condition is to ensure that there is a reasonable "signal" strength from RM carriers for recovering the RM message bits.

Skipped MHs: After re-encoding if a MH is determined as a skipped MB, that MH will be removed. This is because no message information attached with the RM carriers can be recovered from a skipped MH.

6.3. Recapitulation: MH Candidates, RM Carriers and Re-Encoding

Figure 31:
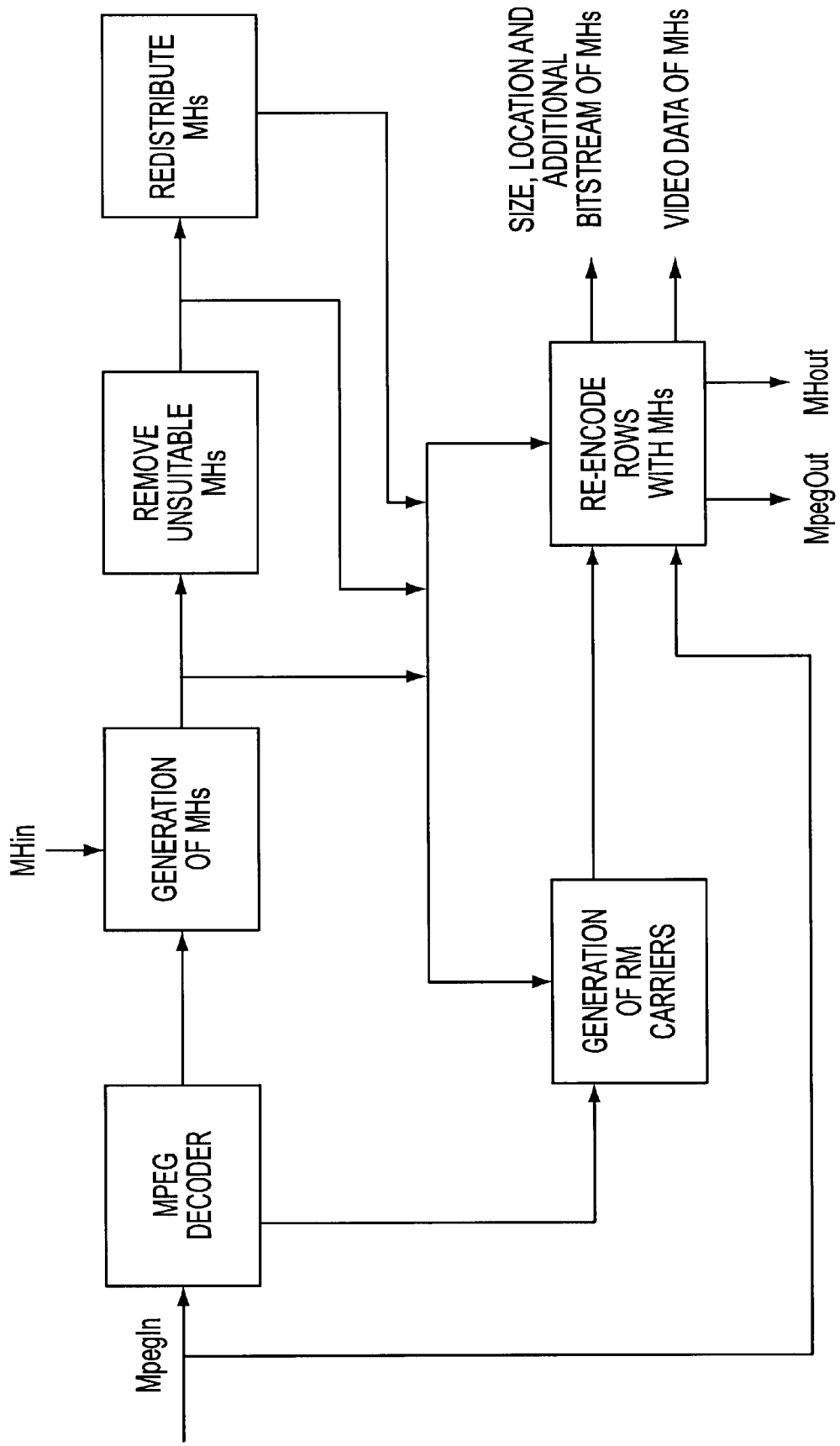
FIG. 31 is a high level diagram summaring functions performed by the invention.

FIG. 31 summarizes the procedure for generating candidates of message holes, running marking carriers and re-encoding, as described previously. To select different ways of performing these processes, different processing modes with a 4-character selection are defined in Table 8. The input MPEG bit stream MpegIn is decoded using a MPEG decoder to obtain all necessary encoding information for re-encoding, as discussed previously. For generating MHs for a frame, the MBA and other parameters which will be used for creating the RM carriers are either read from the input file MHin, or created by classification as discussed previously. The file can be the output file of generating MHs randomly row by row, the MH file after re-encoding, or a file edited by an user. If the approach of generating MHs with classification is used, the whole frame needed to create MHs is reconstructed, and the classification is performed on that frame. For generating RM carriers for some MBs, if the approach of changing video data directly instead of DCT coefficients is used, the video data of those MBs is reconstructed. The generated MHs may be removed by an operator or by running the re-encoding process. The size, location and additional bitstream of MHs as well as the video data of MHs for decoding are created during re-encoding process and sent to the re-distribution program using an output Fifo. The procedure of redistribution of MHs is used to make the average number of MHs as close as possible to the required MH rate. The final MPEG bit stream which contains the carrier 0 and the RMG Packs are generated by the second process GenRmgPck. The RMG Packs store the size, location offset and the carrier 1 bit stream of the MHs.

The algorithm for the GenRm program used for the generation of the MHs is described in FIG. 32. The program first reads the MH re-encoding mode from the input parameter file as in line 1. The different MH processing modes selected by the program for different values of the re-encoding mode are given in Table 8. Each frame from the image input file is then decoded and the decoded information is stored as in line 4. Memory is allocated to store the MH information during the first time as in line 7. The program each time checks to see if the end of sequence has been reached. If so, the program calls the re-distribution procedure to distribute the MHs evenly among the remaining processed frames as in line 10. If the current frame is a B frame, and the approach of generating the MHs with classification is selected, the program calls the classification program to create the MHs for frame as in line 16. Next, the re-encoding function is called to re-encode the rows within the frame containing the MHs as in line 17. The re-encoding function writes the video and MPEG information for the MHs in the frame to the output Fifo. When all the frames within a session have been processed, the GenRm program calls the re-distribution procedure to re-distribute the MHs among all the processed frames in the session as in line 20.

The ReEncoding function uses the third embodiment described above for MPEG re-encoding. To provide reduction of iterations for the re-encoding process, the re-encoding program can also select using a larger delta (greater than 1) by selecting the iterStatus Inc_delta_Row as defined in the iteration process during re-encoding. The iterStatus Incdelta_Row or IncMquant_Row can be selected by the re-encoding function to increase the mquant values of all MBs in the row by a selected value delta or 1 respectively. Also, to speed up the re-encoding process, the previous row mquant increment d is used as an initial estimate for the mquant increment of the next row, and so on. To handle this situation, in cases where the previous value of d is too large, the ReEncoding program can select the iterStatus Dec_delta_Row as defined in the iteration process. The iterStatus Dec_delta_Row and Dec_Mquant_Row can be selected to decrease the mquant values of all MBs in the row by a selected value delta or 1 respectively.

The ReEncoding program also detects if the previous intra and non-intra quantization matrices are changed for the current frame being re-encoded. This information is then used to scale the value of sigma (noise) that is added to the corresponding DCT coefficients during creating the MH carriers for all MHs in the present frame. The program checks and skips re-encoding a row if it has no MHs. The iteration status of a row to be re-encoded is first initialized to Inc_delta_row. The original mquant values of the MBs in the row, are first incremented by the previous re-encoded row mquant increment d. During each pass through the iteration loop, the program then tries to compensate for the MHs, by adjusting the mquant values of the MBs in that row. The exact approach used for changing these mquant values of the MBs depends on the iterStatus value during that pass through the iteration loop.

If the target bit rate is not met after a pre-selected maximum number of iterations, all MHs in the row are removed and the original row is not replaced. Also, if the required mquant increment d in a row becomes greater than a pre-selected allowable maximum distortion value, all the MHs in the row are removed. For a MB corresponding to a MH, the program creates and stores the MH blocks with and without the RMs, only once during the first iteration through the re-encoding loop. The MB corresponding to a MH is then re-encoded for the number of times equal to the specified message hole replacement number (e.g., equal to three: original, carrier 0 and carrier 1). Each time during this re-encoding, the corresponding encoded bit streams are stored in different string buffers with byte alignment for MH replacements.

The MPEG bit stream data for the carriers 0 and 1 of each MH is selected (controlled) in the program by reading in a respective value for each of the carriers from the input parameter file. These values are the MH replacement index values for each of the carriers 0 and 1. Depending on this MH replacement index value, the bit stream data for a carrier is selected from a corresponding string buffer which matches this value. If the difference between the video data of the carriers 1 and 0 for a MH is zero, the program marks this MH as invalid. The bit stream data selected for the carrier 0 (from one of the string buffers) is always inserted into the corresponding MB for each MH. Hence, the output VOB created by the GenRm program contains the carrier 0 bit stream data for each MH.

To speed up the re-encoding process, the MPEG bit stream for the row is written to the Row Buffer only during the final iteration. Otherwise, the program only counts the number of bits needed to re-encode the row during each iteration. Also, the MBs in the row are not quantized again in the final iteration, since the mquant values are not changed. The size, offsets, MPEG bit stream, and video data of original as well as carriers 0 and 1 for each MH along with the MPEG for the row are written to the output Fifo only during the final iteration. The bit stream data for the carrier 1 of each MH is written to the file MHBitOut by the second process GenRmgPck only if the value of MHProcMode[2]='1'. This file is then later used for message bit modulation. If the value of MHProcMode[3]='1', the second process GenRmgPck, also writes the original as well as video data of both the carriers 0 and 1 for each of the MHs to MHVideoOut. Information from the file MHVideoOut is then later used to recover each of the message bit which was inserted into each MH in the original video. The program performs bit stuffing at the end, to keep the same size as the original size of that row. Lastly, the program stores the MH information (seed, MHA, etc. ) for all updated MHs in current frame for re-distribution.

In accord with another aspect of the invention, to further speed up the re-encoding process, the MPEG-2 re-encoding of running marks may be run in parallel on different CPUs and/or different machines. Post-processing is required to put together all the generated RMs and simulate behavior of a playback unit. Hence, in accord with the invention, the program GenRmgPck is used as the second of a two-pass process of running mark generation. After RMs have been generated in the form of re-encoded MPEG-2 data, the program GenRmgPck inserts the RMs in the VOB per DVD specification to create a Running Mark VOB. A carrier 0 for a running mark is inserted in the video while a carrier 1 is inserted in the RMG_PCK sectors, respectively. This second process also checks that the throughput of the playback unit is sufficient to insert RMs in real time. Also, when the new VOB with RMs has been generated, a check is made by the program GenRmgPck to evaluate the number of RMs inserted compared to the length of the movie. Several copies of the message may be complemented to allow a safe recovery of the message sent by the players.

The program GeuRmgPck, has two input modules active when running. The first extracts and identifies the stream of sectors from the input VOB. The second reads packets of data generated by GenRm into various files and understands how the RMs are encoded in MPEG. The main module inserts running mark carrier 0 and 1 into the video packets and RM packets (RMG_PCK), respectively. The output consists of a set of recovery files generated from the data received from GenRm and of a VOB, written one sector at a time after they are modified to support RMs data. When multiple copies of GenRm are used to prepare MPEG-2 miming marks, the program GeuRmgPck collects and puts together all the segments in order to process the VOB completely. If only one process has generated RMs, all the data are stored in a single file named mhdata and GenRmgPck gets all the information it needs from this file. If more than one mhdata file has been generated, then GenRmgPck will load RMs from files mhdata.000, mhdata.001, mhdata.002 etc. up to the last file, which is always named nhdata.999. The program reads the mhdata file and looks for the first RM data it finds, and it copies sectors to the output until it finds a matching sector or an empty RMG_PCK. If there is a sector match, then the MPEG-2 data is replaced and a carrier is added to the RMG_PCK (an RMG_DATA entry is added), and a new RM is read from the mhdata file. If there is an RMG_PCK, then the previous RMG_PCK, maintained in memory and progressively filled up with RMG_DATA fields, is updated by doing a Seek( ) in the output file, and the current RMG_PCK is cleared for the next section.

When a RM is found to be covering two different sectors, GenRmgPck splits it into 2 RMs and two RMG_DATA fields are generated. Both parts of the RM are pointing to the same message bit by using the bcIncrMode field of RMG_DATA. Each time a sector is read, a timing check is done and simulation by the CPU of the playback unit is performed at a sector level to avoid any data overflow. Each sector needs a minimal given processing time depending on its type (RMG_PCK, Video, Others . . . ) and depending on its state: An empty RMG_PCK requires less time than a filled RMG_PCK, and each RM inserted in a sector will require more CPU time for the data replacement at run time. If the insertion of a RM would overflow the processor, then the RM is removed. In accord with the invention, GenRm also sends an original video MB along with RM carriers 0 and 1. When a RM is dropped, the original video MB is inserted in the MPEG-2 video elementary stream, and carriers 0 and 1 are ignored. Since each RM is associated with a message bit, the message bit counter is not increased in this case.

Further, in accord with the invention, the MPEG-2 video stream preferably is cut in multiple sections to speed-up the processing on a multiprocessor computer. This requires special care, since MPEG-2 video coding is based on reference frames coding. Hence, in order to decode the video properly, at least two reference frames have to be loaded. The programs GenRm and GenRmgPck, use the fact that in a DVD VOB, navigation sectors (V_PCK) are immediately followed by an Intra Coded (I) frame. The original stream is thus cut into different segments, as illustrated below. I represents a navigation pack with the following I frame; P and B represent predicted (the second kind of reference frames) and bidirectionally predicted frames respectively. The shaded cells represent the part of each segment where GenRm and GenRmgPck are inserting RMs.

As seen above, for all the segments but the first, the frames before the second I frame are decoded without inserting RMs, because they have already been inserted in the previous segment. However, they must be decoded to make sure that 2 reference frames are loaded when RMs are inserted.

6.4 Multiple Viewing Angles

In accord with another aspect of the invention, the programs GenRm and GenRmgPck can support multiple viewing angles. When using multiple angles, during playback, for part (segment) of the movie, any one viewing angle (video) segment can be played from multiple available angle segments. However, to support multiple viewing angles, the number of RMs in each of the angle segments has to remain constant. This is because the same message bits must be inserted in each angle segment. Also, the RMs (in each angle segment) need not necessarily be at the same location, but the total number must be the same to allow message recovery. The angle segment with the smallest number of RMs gives the size to use for the other angle segments. For the angle segments with a greater number of RMs, either some of them can be dropped or they can be duplicated, (using the bcIncrMode) to increase the message recovery capability.

Figure 33:
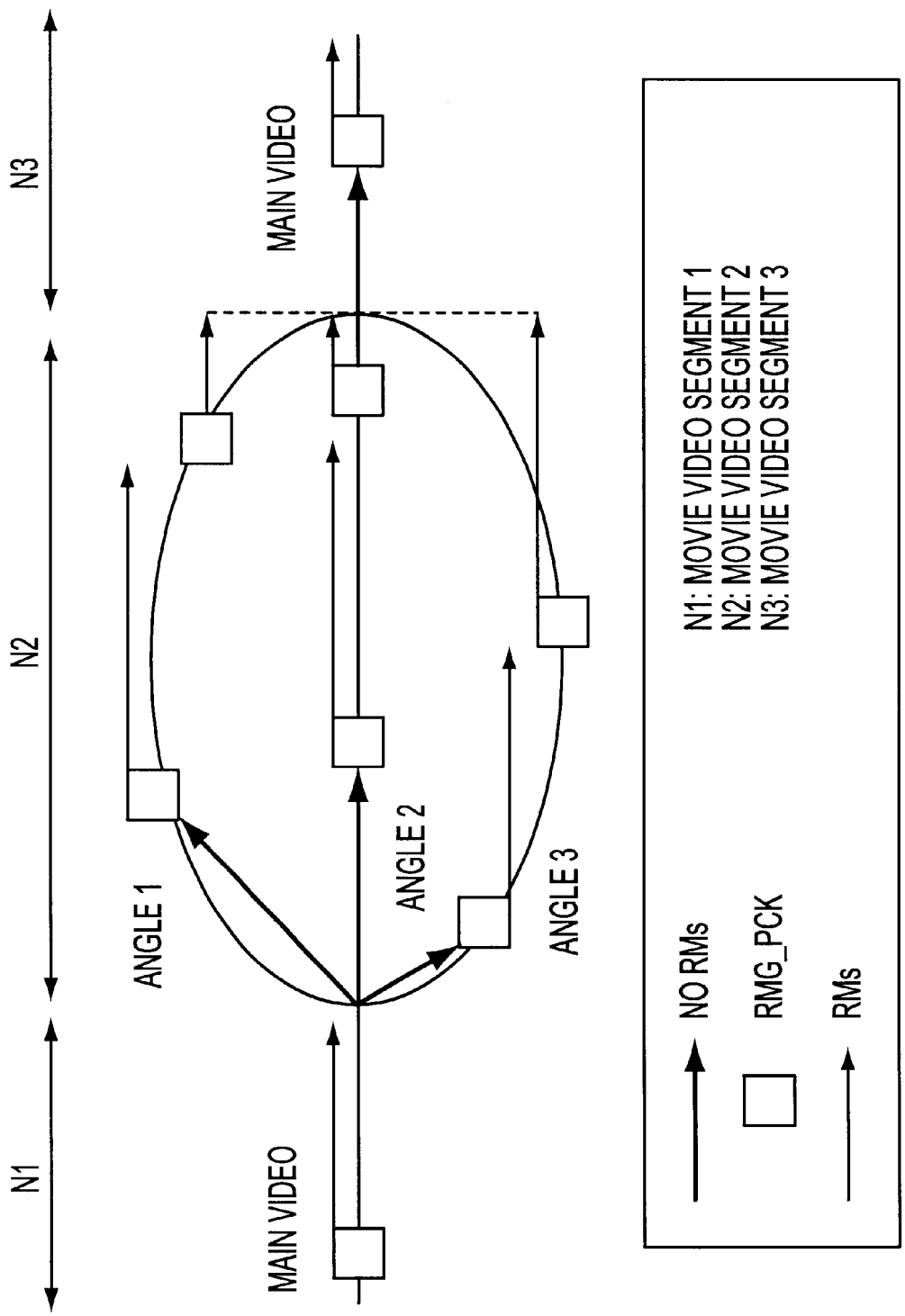
FIG. 33 describes video presentation from varying angles of view.

Three different possible angle segments are shown in FIG. 33. Then, the original video stream is cut into segments N1, N2, and N3 as shown, for processing. The range to which each of the RMG_PCK applies, is adjusted such that no RMs can cross a segment boundary. Hence, for the last pack (RMG_PCK) preceding the various angle segments, all of its RMs are before the angle segments (beginning of segment N2). Similarly, the last RMG_PCK of each angle segment, includes MHs only until the end of segment N2. Hence, as shown, in each angle segment of N2, no RMs can be present initially, since there is no place to store them until the first empty RMG_PCK is found. Similarly, no RMs can be placed in the video at the beginning of segment N3, until the first RMG_PCK in segment N3 is found. Finally, the program GenRmgPck collects and puts together all the video segments, to process the VOB completely, as described previously.

6.5. Fast quantization using look-up tables

As part of the re-encoding, the DCT coefficients of each MB in a row of MBs is quantized. A computationally efficient approach to quantization entails computing the quantization for all possible values of the DCT coefficients in the MB and storing the results in a look-up table (LUT). The computations required to quantize a MB are replaced by much less computationally expensive table look-up operations.

To quantize a MB, the following equation is used:

$$y=[(32 \cdot x+d/2)/d]/(2 \cdot mquant),$$

where x is the DCT coefficient value for each of the pixel in the 8×8 block, d is the quantization matrix coefficient for that pixel, and mquant is the quantization scale factor that determines how coarsely or finely the 8×8 blocks are quan-

---

Original Stream:

I P B ... I B B ... I B ... I B B ... I B ... I B

Segment 1:

I P B ... I B B ... I B ... I B B ... I B ... I B

Segment 2:

I P B ... I B B ... I B ... I B B ... I B ... I B

Last Segment:

I P B ... I B B ... I B ... I B B ... I B ... I B tized. This equation is calculated for each 8×8 block of the MB, including both the luminance and chrominance components, but the quantization matrix will be different for chrominance and luminance values. For each of the 64x values in a 8×8 block, a corresponding y value is calculated. Because of the large number of times this equation is evaluated during re-encoding, a substantial amount of computation can be eliminated by reducing the computations in this equation.

Since the value of y in the preceding equation depends on three integer-valued variables (x, d, and mquant) which can take on a wide range of values, a straightforward implementation of the equation as a 3-dimensional (3 index) LUT would require an impractically large amount of storage. To alleviate the storage requirement, the preceding equation can be divided into two parts and implemented as two LUTs. The two equations are:

$$y_1=(32 \cdot x+d/2)/d,$$

$$y_2=y_1/(2 \cdot mquant),$$

where $y_2$ is identical to y, given earlier. A 2-dimensional (2 index) LUT is used to implement each of these two equations. The LUT associated with the first of these two equations, denoted $LUT_1$, is a 2-dimensional table (a matrix) where x and d are the indices into the table. The LUT associated with the second equation, $LUT_2$, uses the value retrieved from $LUT_1$ and mquant as indices. $LUT_2$ stores all the possible values of $y_2$ (and y).

Consider $LUT_1$. The value of x is between −2048 and 2047. If, for instance, dis 1, the resulting $y_1$ value can range from 32×(−2048) to 32×2047 (−65536 to 65504). Since the range for $y_1$ is large and many of the intermediate values between −65536 and 65504 cannot occur, it is inefficient (in terms of storage) to use the value of $y_1$ directly as an index for $LUT_2$. For this reason, instead of storing the values of $y_1$ in $LUT_1$, another sort of integer value, denoted $yindex_1$, is stored The $yindex_1$ values are a contiguous range of integer values from 0 to some maximum positive value. There is a unique $yindex_1$ value associated with each possible value of $y_1$. In other words, there is a 1 to 1 mapping between $yindex_1$ and $y_1$. The $yindex_1$ values provide a suitable (efficient) index into $LUT_2$.

To recapitulate, the implementation of the quatization equation as a pair of 2-dimensional LUTs may be represented as follows:

$$yindex_1=LUT_1[x,d]$$

$$y_2=LUT_2[yindex_1,mquant]$$

where the notation $LUT_1[x,d]$ represents the value retrieved from $LUT_1$ using the indices x and d.

CONCLUSION

Described are a system and methodology for altering a compressed digital signal stream, such as a video stream encoded in an MPEG standard, to include marks in the form of pixel blocks or macroblocks that preferably are located at textured portions of an image, for reduced visibility, and change in position frame by frame. The locations of the marks are defined by "message holes" stored, together with the original video (or other information), on a reference medium. The marks are decoded by comparing the contents of corresponding message holes in a medium under test, such as a DVD, and the test medium. The marks represent information describing the source from which the medium under test was copied, such as serial numbers of the original medium and playback unit from which the copy was made, and the time of copying. This information is encrypted and scrambled to avoid detection or alteration by a copyist, and preferably spread to enhance discrimination among a large number of sources, and enable demodulation in the presence of noise.

It is to be understood that the best mode of the invention has been described herein, but that the invention could be practiced in other ways. For example, although the invention has been described in the environment of protection of pre-recorded media, the invention is applicable as well to data obtained from the internet or other communication medium. An another variation, the invention is applicable not only to identifying source of copying of movies, as in the examples described, but also of software copied from a disk or other type of medium or from a network. Furthermore, whereas the disclosure is made using the example of tracing to the copyist of protected data, the invention is applicable to using the message data to prevent copying. For example, the invention could be implemented within the context of watermark copy protection, in which the running mark message is applied to prevent legible copies of protected material from being made or usable playback to be performed. Alternatively, the running mark message could, if desired, be compared to an authorization code issued by an institution, authorizing a customer to make a legitimate copy of a disk or data from another form of media or a network. This authorization could be applied, for example, to program a DVD sector or perform other protective implementations for enabling a customer to play the DVD only once or multiple times, or to make a prescribed number of copies. The sector alternatively could be programmed to prevent the customer from using the DVD for any purpose, or for enabling unrestricted use.

TABLE 1

Hadamard-Walsh waveforms for n = 8.

| Waveform No. | Value | | | | | | | | Binary Representaion | | | | | | | |
|---|---|---|---|---|---|---|---|---|---|---|---|---|---|---|---|---|
| 0 | +1 | +1 | +1 | +1 | +1 | +1 | +1 | +1 | 1 | 1 | 1 | 1 | 1 | 1 | 1 | 1 |
| 1 | +1 | −1 | +1 | −1 | +1 | −1 | +1 | −1 | 1 | 0 | 1 | 0 | 1 | 0 | 1 | 0 |
| 2 | +1 | +1 | −1 | −1 | +1 | +1 | −1 | −1 | 1 | 1 | 0 | 0 | 1 | 1 | 0 | 0 |
| 3 | +1 | −1 | −1 | +1 | +1 | −1 | −1 | +1 | 1 | 0 | 0 | 1 | 1 | 0 | 0 | 1 |
| 4 | +1 | +1 | +1 | +1 | −1 | −1 | −1 | −1 | 1 | 1 | 1 | 1 | 0 | 0 | 0 | 0 |
| 5 | +1 | −1 | +1 | −1 | −1 | +1 | −1 | +1 | 1 | 0 | 1 | 0 | 0 | 1 | 0 | 1 |
| 6 | +1 | +1 | −1 | −1 | −1 | −1 | +1 | +1 | 1 | 1 | 0 | 0 | 0 | 0 | 1 | 1 |
| 7 | +1 | −1 | −1 | +1 | −1 | +1 | +1 | −1 | 1 | 0 | 0 | 1 | 0 | 1 | 1 | 0 |

TABLE 2

Hadamard-Walsh waveforms after column and row permutation0s.

| Waveform No. | Column Permutation using $P_{w1}$ | | | | | | | | Column and Row permutations using $P_{w1}$ and $P_{w2}$ | | | | | | | |
|---|---|---|---|---|---|---|---|---|---|---|---|---|---|---|---|---|
| 0 | 1 | 1 | 1 | 1 | 1 | 1 | 1 | 1 | 0 | 1 | 0 | 0 | 1 | 1 | 0 |
| 1 | 0 | 0 | 1 | 0 | 1 | 0 | 1 | 1 | 1 | 1 | 1 | 1 | 1 | 1 | 1 |
| 2 | 1 | 0 | 1 | 0 | 0 | 1 | 1 | 0 | 1 | 1 | 0 | 1 | 0 | 0 | 0 |
| 3 | 0 | 1 | 1 | 1 | 0 | 0 | 1 | 0 | 0 | 1 | 0 | 1 | 0 | 1 | 1 |
| 4 | 1 | 1 | 1 | 0 | 1 | 0 | 0 | 0 | 1 | 0 | 1 | 1 | 0 | 0 | 0 | 1 |
| 5 | 0 | 0 | 1 | 1 | 1 | 1 | 0 | 0 | 0 | 1 | 1 | 0 | 0 | 1 | 0 | 1 |
| 6 | 1 | 0 | 1 | 1 | 0 | 0 | 0 | 1 | 0 | 1 | 1 | 1 | 0 | 0 | 1 | 1 |
| 7 | 0 | 1 | 1 | 0 | 0 | 1 | 0 | 1 | 0 | 0 | 1 | 1 | 1 | 1 | 0 | 0 |

|  | 0 | 1 | 2 | 3 | 4 | 5 | 6 | 7 | | 0 | 1 | 2 | 3 | 4 | 5 | 6 | 7 |
|---|---|---|---|---|---|---|---|---|---|---|---|---|---|---|---|---|---|
| $P_{w1}$ | 2 | 0 | 4 | 1 | 6 | 5 | 7 | 3 | $P_{w2}$ | 1 | 3 | 0 | 6 | 2 | 7 | 4 | 5 |

TABLE 3

DivxStreamId for ProviderDefinedStream for different Divx applications.

| DivxStreamId | Applications |
|---|---|
| 00000001b | Transmitted RM message by replacing bit stream of message holes of any DVD packs except navigation packs, i.e. no navigation pack is allowed to change for the running mark process. |
| Others | Reserved for other Divx applications. |

TABLE 4

Data structure of a RMG header.

| Variables | Description |
|---|---|
| u32 bc | It points to the first bit to be sent for a RMG_PCK in the RMG bit array Bits[]. |
| u8 NumRMG | Number of times of running marking in this RMG_PCK. |
| u8 NumBS | Number of additional bitstreams used for replacing a video stream. It is required that there is at least one additional bitstream (i.e. NumBS > 0) and the value of (NumBS + 1) should be a power of 2. |
| u8 Reserved A | Reserve for future modifications. |
| u1 FNextRMG | If FNextRMG = 0, there are no NextRMG data and Reserved Area in all RMG data. If FNextRMG = 1, all NextRMG data have to be used for the location of next RMG data. |
| u1 FSizeHole | If the size of message holes within this RMG_PCK change, then there are SizeHole data in the RMG data and FSizeHole=1. Otherwise, FSizeHole=0 and SizeHole data occurs once after the RMG header. |
| u6 ReplaceMode | It determines an algorithm with proper parameters to be used for the bitstream replacement of a message hole. |

TABLE 5

Data structure of a RMG data.

| Variables | Description |
|---|---|
| u16 NextRMG | Offset in bytes form the beginning of a RMG_PCK to the next running marking data. Zero is the end of the chain. |
| u5 Reserved B | Reserved for future modifications. |
| u11 SizeHole | Size of message hole in bytes for a running mark. |
| u32 SectorNum | Logical sector number of a V_PCK that a message hole locates. |
| u4 bcIncrMode | It controls the increment of bc as described in Table 6. |
| u12 Offset | Offset in bytes between a message hole to the beginning of the physical sector pointed by SectorNum[], including physical sector, pack and packet headers. |
| u8 b[NumBS][SizeHole] | Additional MPEG bitstreams of length SizeHole for one running mark. |
| Reserved C | Reserve for future modifications. |

TABLE 6

Look up table for obtaining bcIncrValue from bcIncrMode. bcIncrValue is an increment value for updating bc as in equation (1).

| bcIncrMode | | bcIncrValue | Formula |
|---|---|---|---|
| 0 | 0000 | 1 | |
| 1 | 0001 | 2 | |
| 2 | 0010 | 3 | |
| 3 | 0011 | 4 | |
| 4 | 0100 | 5 | bcIncrMode+1 |
| 5 | 0101 | 6 | |
| 6 | 0110 | 7 | |
| 7 | 0111 | 8 | |
| 8 | 1000 | 0 | |
| 9 | 1001 | −1 | |
| 10 | 1010 | −2 | |
| 11 | 1011 | −3 | 8 − bcIncrMode |
| 12 | 1100 | −4 | |
| 13 | 1101 | −5 | |
| 14 | 1110 | −6 | |
| 15 | 1111 | −7 | |

TABLE 7

Iteration status of re-encoding.

| iterStatus | Description |
|---|---|
| Inc_delta_Row | Number of bits after re-encoding is still far away from the original number of bits. It is defined as the iteration status before that the condition of BitsDiff <= 0 meets for the first time. |
| Dec_delta_Row | Number of bits after re-encoding is still far away from the original number of bits. It is defined as the iteration status before that the condition of BitsDiff >=0 meets for the first time. |
| Inc_Mquant_Row | It is the iteration status set after reaching the status Dec_delta_Row in order to adjust the number of bits after re-encoding as close as possible to the original number of bits. |
| Dec_Mquant_Row | It is the iteration status set after reaching the status Inc_delta_Row in order to adjust the number of bits after re-encoding as close as possible to the original number of bits. |
| Inc_Mquant_MB | Number of bits after re-encoding is close to the original number of bits. It is defined as the iteration status before that the condition of BitsDiff <= meets for the second time. |
| Final_Iteration | It is defined as the iteration status after that the condition of BitsDiff = 0 meets. Do not change the mquant values, and re-encode one more time to send out the video and bit stream data of the MH(s). The exit the iteration loop. |

TABLE 8

Different MH processing modes.

| MH Processing Mode | Function | Char | Description |
|---|---|---|---|
| MHProcMode[0] | Create MHs | 0 | MHs are read from the file MHin. |
| | | 1 | MHs are generated randomly with classification. |
| MHProcMode[1] | Perform re-encoding | 0 | Re-encoding is skipped completely. |
| | | 1 | Re-encoding is performed for the rows with MHs. |
| MHProcMode[2] | Write out bit stream of MHs | 0 | No bit stream data of MHs is written to MHBitOut. |
| | | 1 | Additional bit stream of MHs is written to MHBitOut. |
| MHProcMode[3] | Write out video data of MHs | 0 | No video data of MHs is written to MHVideoOut. |
| | | 1 | Video data of MHs is written to MHVideoOut. |

What is claimed is:

1. A method of processing an information-bearing compressed digital signal stream, produced by an information signal source, to be recorded on an original recording medium, to mark information content of the information-bearing signal stream so as to enable tracing to a source of unauthorized copying of the information-bearing compressed digital signal stream from the original recording medium, comprising:

receiving an original compressed, digital signal stream during playback of the original recording medium;

receiving a predetermined modification stream derived from said original compressed digital signal stream;

obtaining a source-of-copying message corresponding to a source of playback of said original compressed digital signal stream from the original recording medium; and producing a modified signal stream by modifying the original compressed digital signal stream to include the source-of-copying message using the predetermined modification stream.

2. The method as described in claim 1, wherein the modified signal stream is reproduced on a second recording medium, including:

reproducing the modified signal stream during playback of the second recording medium; and comparing the original information-bearing compressed digital signal stream with the modified signal stream, and extracting the source-of-copying message.

3. The method as described in claim 1, wherein the information-bearing compressed digital signal stream is a video signal, and wherein modifying the compressed digital signal stream comprises modifying a characteristic of an image produced by said compressed digital signal stream.

4. The method as described in claim 3, wherein said compressed digital signal is pre-encoded in an MPEG compression standard.

5. The method as described in claim 4, including selecting at least one area of a video frame for modification, and modifying the selected video frame area.

6. The method as described in claim 5, including storing an address of a selected video frame area.

7. The method as described in claim 6, wherein selecting is performed on a basis of an image attribute of an image within the video frame.

8. The method as described in claim 7, wherein the image attribute is an image boundary.

9. The method as described in claim 6, including replacing the selected frame area with a modified frame area corresponding to said source-of-copying message.

10. The method as described in claim 9, including conditioning the selected frame area prior to replacement thereof by a modified frame area.

11. The method as described in claim 10, wherein said frame areas comprise pixel blocks or macroblocks.

12. The method as described in claim 5, including selecting different frame areas of subsequent frames for modification in correspondence to said source-of-copying message.

13. The method as described in claim 1, including encrypting said source-of-copying message prior to modification of said compressed digital signal stream.

14. The method as described in claim 1, including scrambling the source-of-copying message prior to modification of said compressed digital signal stream.

15. The method as described in claim 1, including encoding said source-of-copying message to produce a spread spectrum carrier prior to modification of said compressed digital stream.

16. A method for processing a compressed digital information in the form of an original MPEG encoded signal stream played back from an original prerecorded medium to enable tracing of unauthorized copying of the signal stream from the medium, comprising:

producing an original medium storing information in an MPEG standard together with preselected pixel block locations, within video frames, for data bits pertaining to information describing a subsequent playback of the original medium;

receiving the MPEG data stream during said subsequent playback of the original medium; and producing a modified signal stream by modifying the MPEG signal stream to embed said subsequent playback information in pixel blocks corresponding to the preselected pixel block locations.

17. The method as described in claim 16, including comparing a content of the original signal stream with that of the modified signal stream played back from a recording medium suspected to be an unauthorized copy of the original medium to extract the playback information.

18. The method as described in claim 16, wherein the playback information includes one or more of the following: recording medium identification, reproduction device identification and time of data stream reproduction.

19. The method as described in claim 16, including selecting at least one area of a frame as a message area for modification, and modifying the selected area.

20. The method as described in claim 19, wherein selecting is performed on a basis of an image attribute.

21. The method as described in claim 20, wherein the image attribute is an image boundary.

22. The method as described in claim 19, including replacing the selected frame area with a modified frame area designating an element of said playback information.

23. The method as described in claim 22, including conditioning the selected frame prior to replacement by a modified frame area.

24. The method as described in claim 22, wherein only B-frames of the MPEG data stream are selected as frame areas for replacement.

25. The method as described in claim 19, including selecting different areas of subsequent frames for modification.

26. The method as described in claim 19, wherein said areas comprise pixel blocks or macroblocks.

27. The method as described in claim 26, including scrambling pixels blocks or macroblocks prior to embedding the playback information into the MPEG signal stream.

28. The method as described in claim 16, including encrypting the playback information prior to modifying the MPEG signal stream.

29. The method as described in claim 16, including encoding said playback information to produce a spread spectrum carrier prior to modifying said MPEG signal stream.

30. The method as described in claim 16, including error correcting the playback information prior to modifying the MPEG signal stream.

31. A system for processing compressed digital information in the form of an MPEG encoded signal stream played back from an original recording medium to enable tracing of unauthorized copying of the signal stream from the original medium, comprising:

a detector for obtaining a source-of-copying message pertaining to a source of playback of the original medium containing the compressed signal stream;

a receiver for receiving the MPEG signal stream upon playback from the original recording medium and for receiving a predetermined modification stream derived from said original compressed digital signal stream; and a combiner for embedding the source-of-copying message in the MPEG signal stream using the predetermined modification stream.

32. The system as described in claim 31, including a memory for storing locations of pixel blocks among selected video frames of the MPEG encoded signal stream.

33. The system as described in claim 31, including a scrambler for scrambling the source-of-copying message received by the detector.

34. The system as described in claim 31, including an encryption unit for encrypting the source-of-copying message received by the detector.

35. The system as described in claim 31, including an encoder for encoding said source-of-copying message to produce a spread spectrum carrier prior to embedding with said MPEG signal stream.

36. A method of processing a data stream in the form of a compressed digital signal copied from an original data stream, to enable tracing to the source of copying, comprising:

receiving the original data stream;

locating message holes of prescribed size in predefined, non-regularly occuring locations in the original data stream; and extracting from said data stream a source-of-copying message embedded at said message holes.

37. A method for processing a data-bearing digital signal to be recorded on a storage medium so as to enable tracing an unauthorized copy of the data to a copyist, comprising:

receiving a digital signal stream bearing data by playing back the stream from a medium on which the digital signal stream is stored;

receiving a predetermined modification stream derived from said original compressed digital signal stream;

obtaining a source-of-copying message pertaining to the source of playback of said data;

producing a spread spectrum carrier bearing said source-of-copying message; and combining the encoded source-of-copying message with said digital signal stream using the predetermined modification stream.

38. The method as described in claim 37, wherein the digital signal stream is compressed.

39. The method as described in claim 38, wherein the digital signal stream is encoded in an MPEG compression standard.

* * * * *